(12) United States Patent
Geiser

(10) Patent No.: US 6,199,461 B1
(45) Date of Patent: Mar. 13, 2001

(54) AUTOMATIC BAR FEEDING DEVICE, ESPECIALLY FOR CNC LATHES

(76) Inventor: Markus Samuel Geiser, Route de Diesse, CH-2516 Lamboing (CH)

(*) Notice: Subject to any disclaimer, the term of this patent is extended or adjusted under 35 U.S.C. 154(b) by 0 days.

(21) Appl. No.: 09/148,698

(22) Filed: Sep. 4, 1998

(30) Foreign Application Priority Data

Sep. 5, 1997 (EP) .................................................. 97810635

(51) Int. Cl.$^7$ .................................................. B23B 13/04
(52) U.S. Cl. .............................. 82/124; 82/125; 82/126; 82/127
(58) Field of Search .............................. 82/123, 124, 127, 82/126; 414/14, 17, 18, 736

(56) References Cited

U.S. PATENT DOCUMENTS

| 3,353,688 | 11/1967 | Kuckelsberg . | |
|---|---|---|---|
| 3,937,331 | 2/1976 | Spercel . | |
| 4,423,651 | 1/1984 | Hardee . | |
| 4,604,924 | * 8/1986 | Cucchi | 414/14 |
| 5,320,008 | * 6/1994 | Cucchi | 82/126 |
| 5,556,253 | * 9/1996 | Rozendaal | 414/797.7 |
| 5,662,014 | * 9/1997 | Link | 82/125 |

FOREIGN PATENT DOCUMENTS

| 735 412 | 12/1969 | (BE) . | |
|---|---|---|---|
| 000676939 A5 | * 3/1991 | (CH) | 82/126 |
| 970 427 | 9/1958 | (DE) . | |
| 91 09 290 | 7/1992 | (DE) . | |
| 026 370 | 4/1981 | (EP) . | |
| 559094 | 9/1993 | (EP) . | |
| 587 248 | 3/1994 | (EP) . | |
| 631 833 | 1/1995 | (EP) . | |
| 2528342 | 12/1983 | (FR) . | |
| 7 299 605 | 11/1995 | (JP) . | |

OTHER PUBLICATIONS

Link H: "Erfahrungen Mit Reaktionsharzbeton Im Werkstatt Und Betrieb" Werkstatt Und Betrieb, vol. 121, No. 8, 1988, Munchen, p. 641/642 XP002056419.

* cited by examiner

Primary Examiner—Henry Tsai
(74) Attorney, Agent, or Firm—Foley & Lardner

(57) ABSTRACT

The automatic bar feeder device comprises a loading device that loads or unloads a bar from a hopper while avoiding shock exerted by the bar against an element of the magazine bar feed, the bar to be treated being seized by claws (42) which transport the bar towards the bench (22) and lay it smoothly down there. The movements of the loading device (40) are reversible so that it is able to act also as an unloading device. The loading/unloading device (40) cooperates with the long advance device (70) thanks to a combination of movements. Finally, the short advance device (40) and the long advance device (70) are driven for advancing the bar into a lathe, by one and the same element (98), the two devices are able to be coupled and uncoupled through a latching/unlatching device (80).

20 Claims, 23 Drawing Sheets

AUTOMATIC BAR FEEDING DEVICE, ESPECIALLY FOR CNC LATHES

BACKGROUND OF THE INVENTION

1. Field of the Invention

This invention relates to an automatic bar feeder device, especially for CMC lathes, which is to be used in a magazine bar feed, and comprising a device for transferring a bar to be machined from a hopper on a bench, and a device for advancing said bar into the lathe, this advancing device containing a short advance module equipped with a flag, and a long advance module equipped with a thrustor.

Feeder devices, comprising a bar loading device, a device for their advance, and a centering device, are used in apparatuses currently called "magazine bar feeds" of which different types are on the market.

The task of these apparatuses is to automatically feed especially automatic or CNC lathes; automatic feed sensibly increases the yield of the latter and substantially reduces the unit costs of the pieces machined on the lathes of this kind.

2. Description of the Prior Art

Known magazine bar feeds generally have the shape as shown, in a very schematical manner, in attached FIGS. 1A and 1B (side and front view, respectively): There is a frame 10, a cradle 11 within the frame, a bench 12 shaped as a very open V, said cradle being optionally covered by a hood 13, and an inclined plane hopper 14 whose inclination can be adjusted by the device 15. A bar 17 which is laid down on the bench 12 has beforehand been transferred from the hopper 14 on said bench. The bar is to be machined on a lathe, represented by a mandrel 19 and a headstock 9, after having been introduced in this headstock by an advance device 18.

The functional principle of known feeder devices can easily be understand from FIG. 2A to 2F which show a lateral view of such a device:

In FIG. 2A, the bars to be machined 17A, 17B, 17C etc. are placed or stored on the hopper 14 and blocked there by a shoulder 14A. The bench 12 and a set of grippers 16 (from which only one is shown) connected thereto are in a defined position which corresponds to that shown in FIG. 2D in such a manner that, when a bar 17A is placed on the V, its axis and the axis of the headstock of the lathe would have the same support.

In a first step, the unit 12, 16 rises, the grippers lift the first bar 17A according to the vertical arrow (FIG. 2B) until said bar swings over the shoulder 14A of the hopper 14 (FIG. 2C) and falls all of a sudden into the V of the cradle (FIG. 2D, showing the position of the bench 12 where the axis of the bar 17A and that of the lathe headstock have the same support). During these operations, the next bar 17B is held back by the rear flank of the gripper 16.

In a second step (not shown), a short thrustor called flag (first module of an advance or thrusting device) pushes the bar to be machined into the lathe headstock.

In a third step, the unit 12, 16 goes down according to the arrow (FIG. 2E) until it takes its original or starting position of FIG. 2A (FIG. 2F). Simultaneously, the next bar 17B which is no longer held back by the gripper 16, rolls on the inclined plane of the hopper 14 (see arrow in FIG. 2F) and comes to rest against the shoulder 14A which blocks the travel.

Finally, in a fourth step, the flag goes back and gives room for a long thrustor (second element of the advance device) whose function is to take care of the advance or the succeeding advances of the bar until its complete machining, according to the strokes shown in FIGS. 3A to 3D: The material advance (namely that of the bar 17A) is effected by the action of the thrustor 18, the jaws of the mandrel 19 being open (FIG. 3A). The bar is then clamped (FIG. 3B), and the machining is undertaken (FIG. 3C) When the machining is finished, cutting off is made (FIG. 3D), and a new machining cycle can be started, for example on the same bar 17A; this is to say that the mandrel jaws open, the thrustor 18 is advanced and pushes the bar 17A over a defined distance, etc.

These known apparatuses and devices have several kinds of disadvantages.

First, the loading operations come about brutally since the apparatus is subject to two succeeding shocks during each of these operations.

A first shock comes from the fall of the bar 17 to be machined (17A, 17B, etc. in FIGS. 2A to 2F) into the V of the bench down from the grippers (FIG. 2C).

A second shock occurs from the fall of the next bar 17B against the stop shoulder 14A of the hopper (see FIGS. 2E and 2F), this bar being itself under the push of the higher bars 17C, 17D, etc. (FIG. 2F).

As a rough indication, the weight of a sole bar having a diameter of 80 mm and a length of 1,200 mm is about 47 kg.

It can easily be understood that these shocks, as to their effects, will be damaging to the magazine bar feed itself as well as to the lathe which it feeds. More particularly, the shocks provoke an increasing misalignment between the magazine bar feed and the headstock of the lathe at such an extent that, from a certain moment, the bars will hit the headstock which will thus cause serious damages (especially destroying the bearings of the headstock, resulting in worse machining precision and reduction of the lifetime of the lathe).

Another serious drawback is the absence of any apparatus polyvalence since the known devices only allow the loading of bars and not their unloading. However, in some cases, for example when bars should be machined at one end, it would be advantageous to unload these bars after machining by means of the magazine bar feed.

In certain known magazine bar feeds, the advance device comprises two parallel disposed cylinders which are next but distant to each other, a first cylinder coacting with the short thrustor (flag) and a second one with the long thrustor. The loading comprises three steps: first, the introduction of the bar by means of the flag, driven by the first cylinder, and the retreat of said flag; then, a lateral displacement of the two cylinders by means of a horizontally movable carriage, in order to place the long thrustor in the headstock axis, namely the bar axis; and finally the advance of the long thrustor, driven by the second cylinder. Other known magazine bar feeds are equipped with two thrustors, a short and a long one, vertically superimposed and mounted on a vertically movable carriage. In still other known magazine bar feeds, already more improved, the two thrustors are mounted on a seesaw, the short thrustor or flag making the first introduction and the long thrustor pushing the bar into the headstock for machining, these two thrustors being driven by the same cylinder but the seesaw remaining driven by a separate cylinder. All these devices would be improved when they were less complicated, more purposeful and less expensive.

Regarding known centering devices, their handling is not easy, and the centering operations are carried out neither quickly nor purposefully.

SUMMARY OF THE INVENTION

The object of the present invention is to provide a device which overcomes the described drawbacks and whose manufacture is moreover less expensive. This object is met by the device of this invention wherein the bar loading device comprises means which coact in such a manner as to avoid any shock exerted by the bar against any element of the magazine bar feed, especially against the bench and the hopper, during the loading of the bar. Furthermore, the flag and the thrustor are driven by one and the same element alone, the short advance module and the long advance module coacting by means allowing their coupling an uncoupling.

Inventive details and special or preferred embodiments are disclosed and defined in the following description and the dependent claims.

BRIEF DESCRIPTION OF THE DRAWING

An embodiment of the device will now been described as a non-limiting example, and reference will be made to the drawing wherein.

DETAILED DESCRIPTION OF THE INVENTION

Figure 1B:
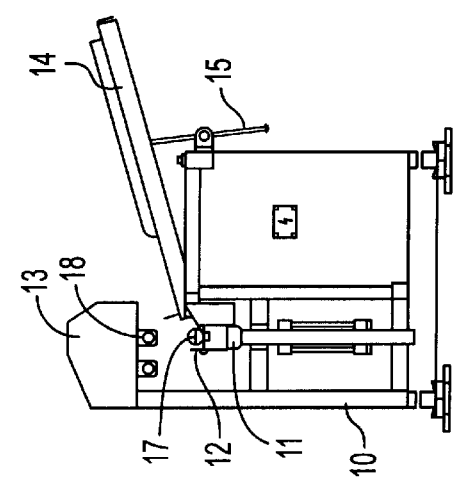
FIG. 1B shows a front view of the feeder of FIG. 1A.
Figure 1A:
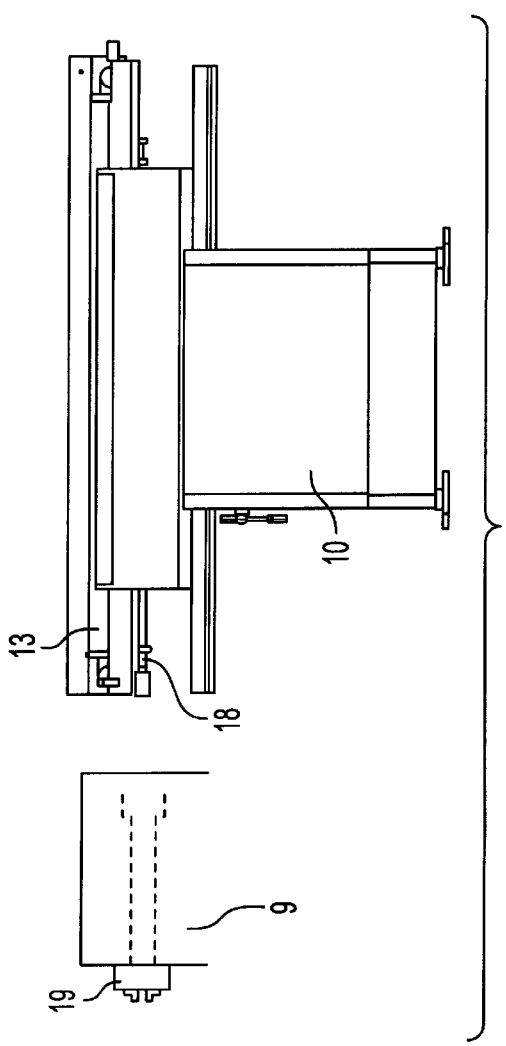
FIG. 1A shows a lateral view of a feeder according to the prior art.
Figure 3D:
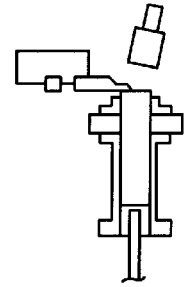
FIG. 3D schematically shows a fourth machining step using the device of FIGS. 1 and 2 (prior art)
Figure 3C:
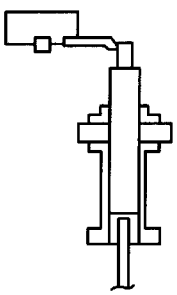
FIG. 3C schematically shows a third machining step using the device of FIGS. 1 and 2 (prior art)
Figure 3B:
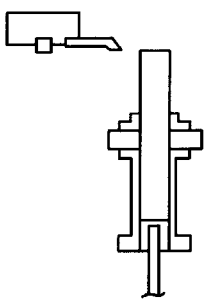
FIG. 3B schematically shows a second machining step using the device of FIGS.1 and 2 (prior art)
Figure 3A:
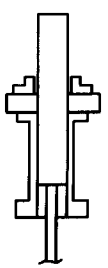
FIG. 3A schematically shows a first machining step using the device of FIGS. 1A and 2 (prior art)
Figure 2A:
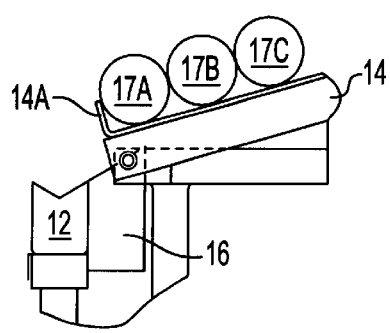
FIG. 2A schematically shows the functioning of the feeder according to FIGS. 1A and 1B in a first step.
Figure 2B:
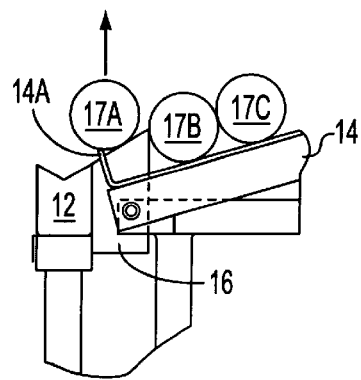
FIG. 2B schematically shows the functioning of the feeder according to FIGS. 1A and 1B in a succeding step.
Figure 2C:
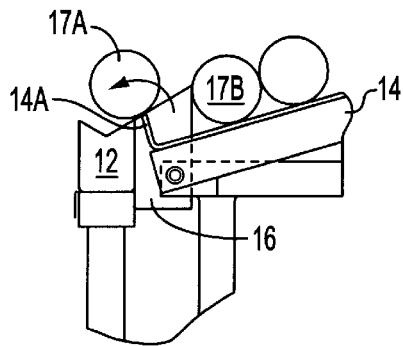
FIG. 2C schematically shows the functioning of the feeder according to FIGS. 1A and 1B in a succeding step.
Figure 2D:
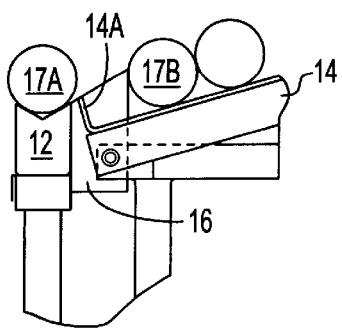
FIG. 2D schematically shows the functioning of the feeder according to FIGS. 1A and 1B in a succeding steps.
Figure 2E:
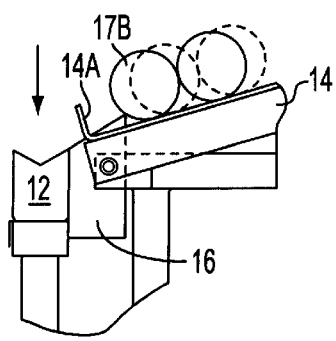
FIG. 2E schematically shows the functioning of the feeder according to FIGS. 1A and 1B in a succeding steps.
Figure 2F:
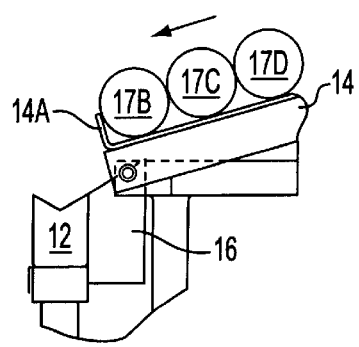
FIG. 2F schematically shows the functioning of the feeder according to FIGS. 1A and 1B in a succeding steps.
Figure 4A:
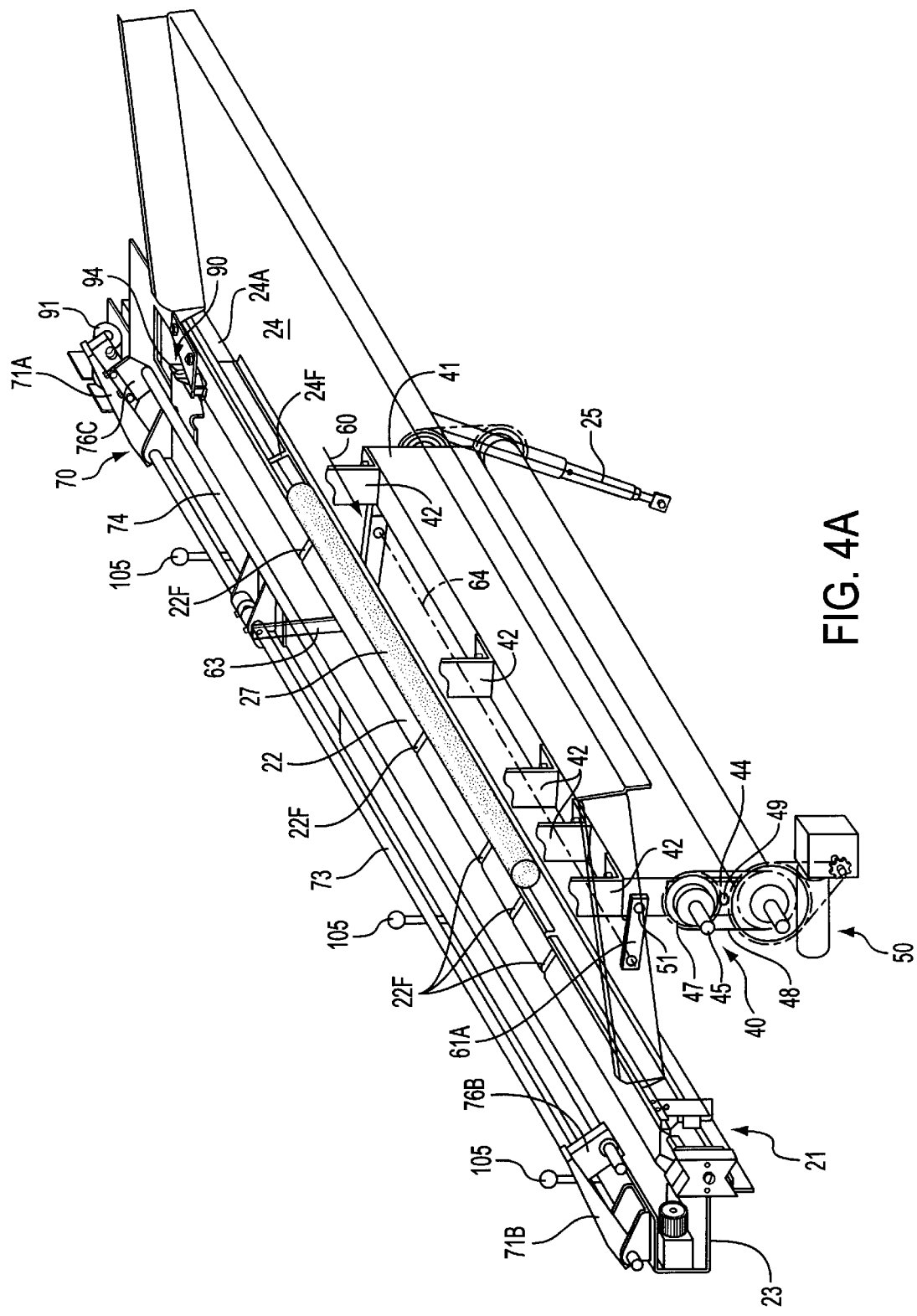
FIG. 4A is a perspective view of the feeder according to an embodiment of the invention, the engine frame being not shown.
Figure 4B:
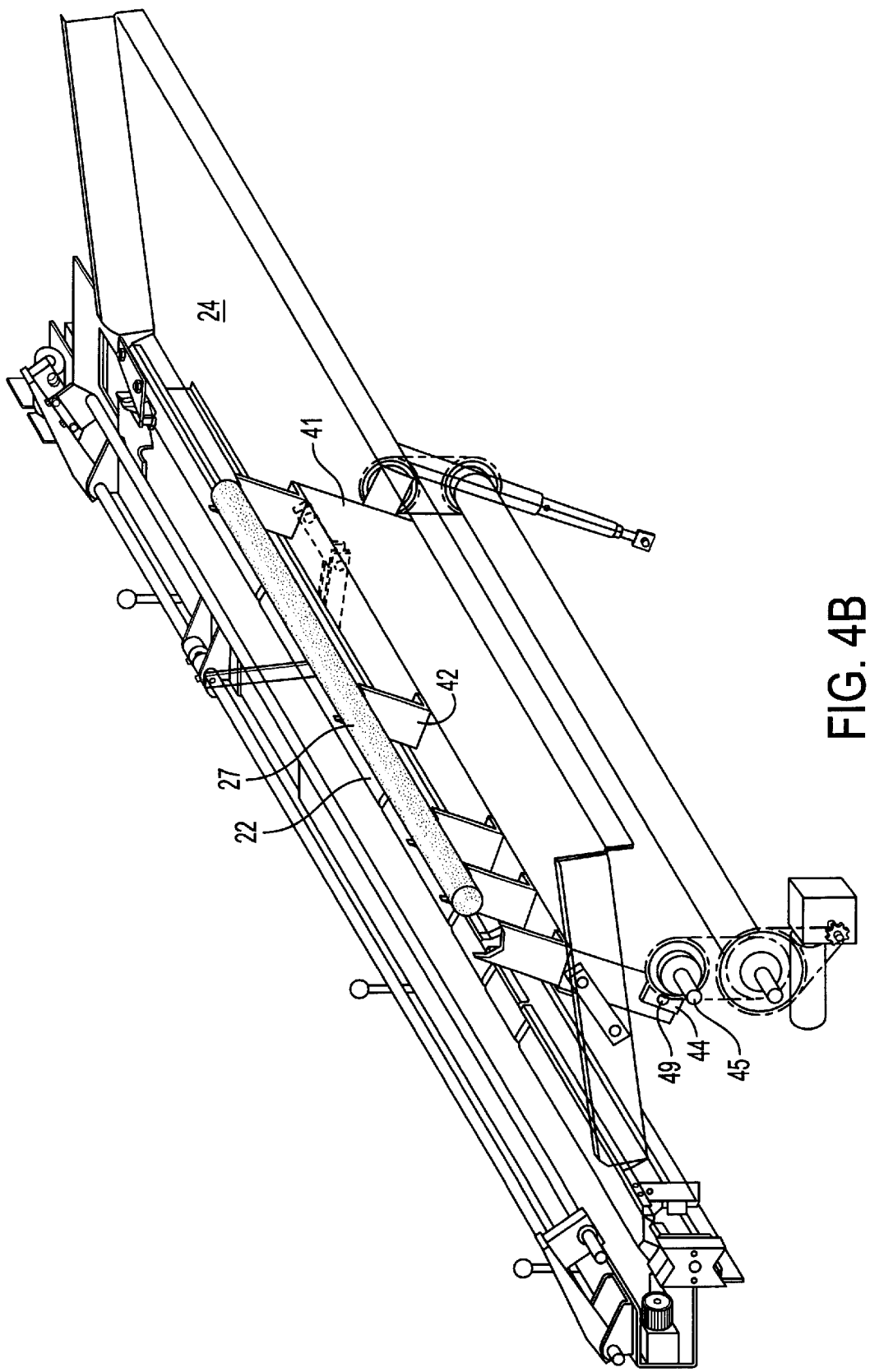
FIG. 4B is another perspective view of the feeder according to an embodiment of the invention, the engine frame not shown.
Figure 4C:
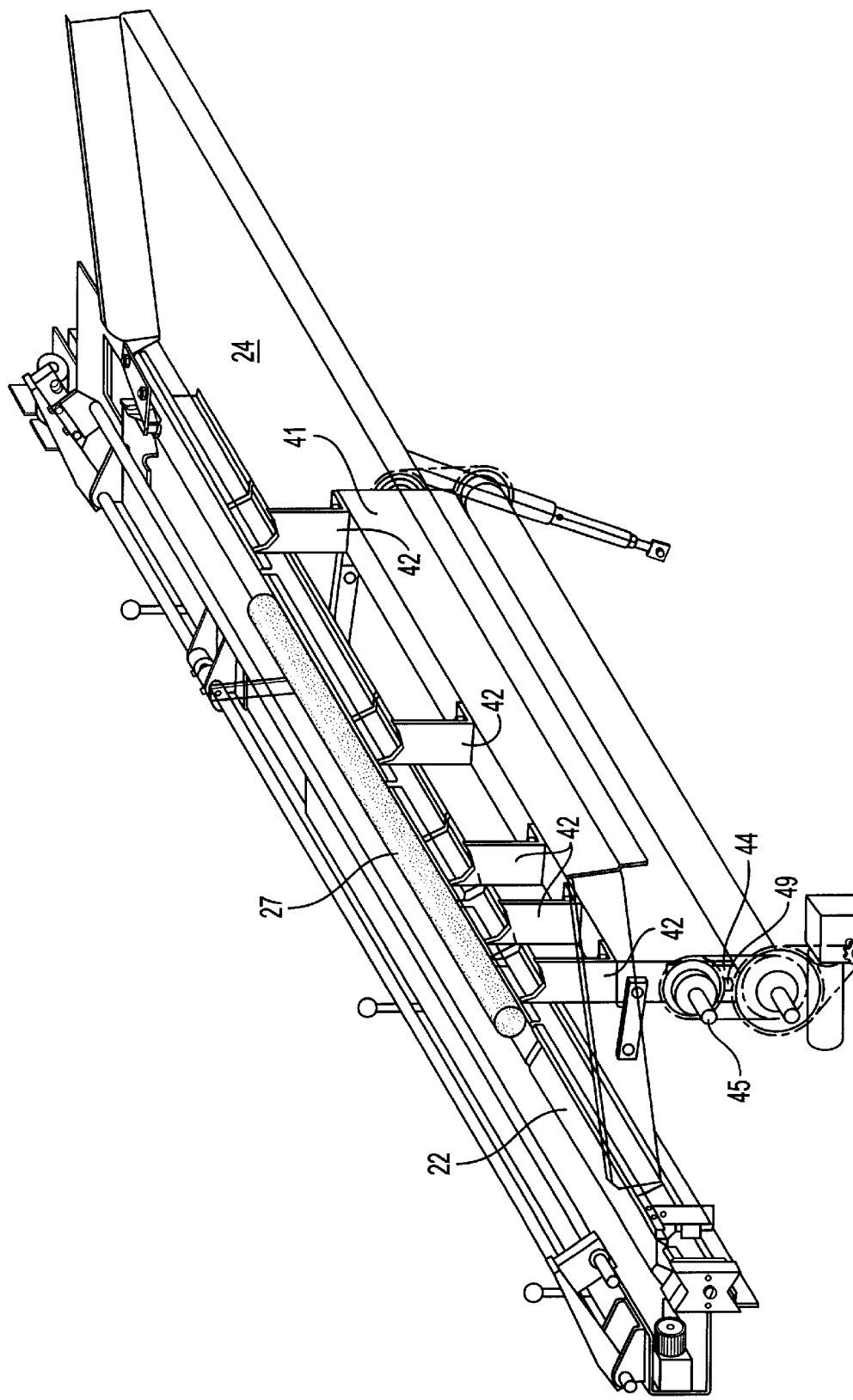
FIG. 4C is another perspective view of the feeder according to an embodiment of the invention, the engine not shown.

FIGS. 4A, 4B, 4C show schematical perspective views of a bar loading/unloading device 40, of modules 70, 90 forming the essential elements of a device advancing (or pushing) the bars to the lathe (not shown), as well as a device 60 connected to a distance rod 63 that participates in the cooperation between the devices 40, 60 and the long advance module 70 (currently called long thrustor since it comprises a long thrustor rod 74 held by two stirrups 71A, 71B). These four units 40, 60, 70 and 90 are covered within the magazine bar feed.

Figure 5:
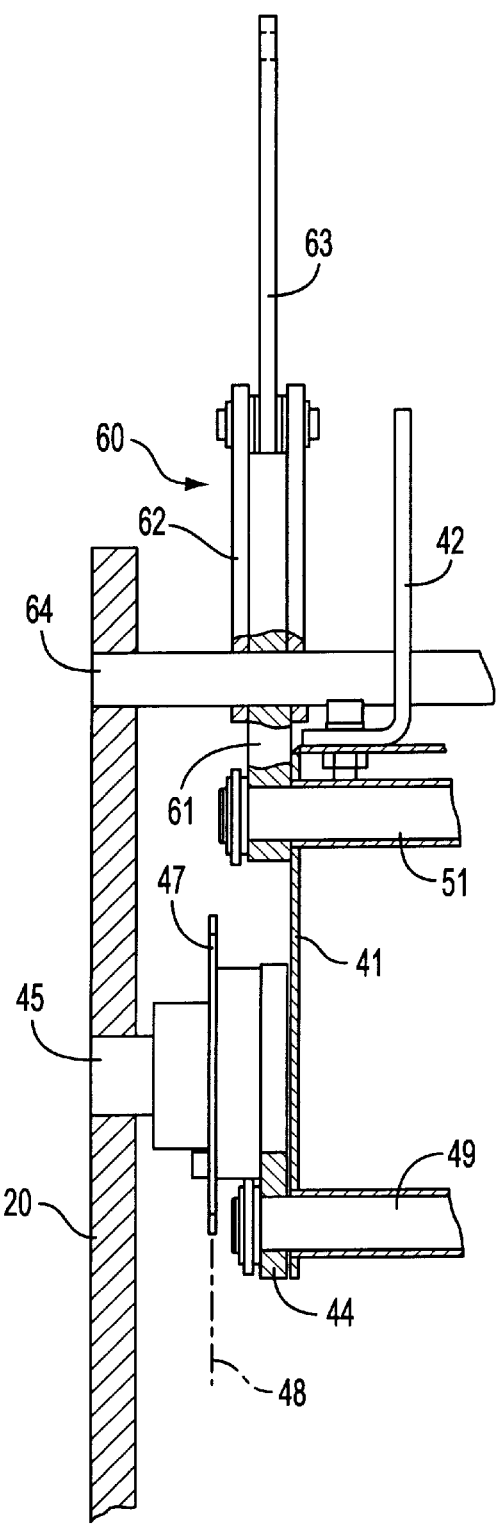
FIG. 5 shows a cross section in a plane going through the axes of shafts 45, 51 in FIG. 4A.

More particularly, a cradle 21 (mounted on a frame not shown here but whose one wall can be seen in FIG. 5) is shown on which a bench 22 is arranged; the V shaped upper face can be distinguished comprising slots or indents 22F. A bar 27, called for being machined and therefore to be firstly laid down on said bench 22, is situated against the shoulder 24A of a hopper 24 having an inclined plane whose inclination can be adjusted by a cylinder 25 (in the Figures, the hopper is drafted as "transparent" for showing the parts underneath and behind).

The cradle further comprises a lying U-shaped tubular conduit 23 integral with the bench 22. This conduit is provided for the displacement from one end to the other of the first, short advance module 90 (or short thrustor, more currently called flag) of which only one paw 94 is shown, by the action of a carriage 98 driven by motor means 91 and guided on a guiding rail 97 (the carriage 98 and the rail 97 cannot be seen in FIG. 4A but are shown, for example, in FIG. 6A).

The loading/unloading device 40 comprises in particular a seesaw 41 to which a set of claws 42 is fastened by not referenced fastening means. The seesaw and the claws have the same orientation (in FIG. 4A, the upper portion of the claws 42 has been cut off). These two elements can be moved thanks to motor means and reduction gear 50. It should be noticed that the seesaw comprises slots or indents 24F; only one of them can bee seen in FIG. 4A. These indents are exactly opposite to the slots 22F. The number of slots or indents 22F and 24F corresponds to the number of claws 42, these indents being provided for allowing the passage of the claws. According to the Example, the number of claws in the set 42 is five.

The above mentioned movement will now be described, first briefly in the following paragraph and then in detail with reference to FIGS. 6A, 6B, etc.

With simultaneous reference to FIGS. 4A and 5 which is a partial cross section according to a plane passing through the axes of the shafts 45 and 51 (position shown in FIG. 4A), it can be understood that the seesaw 41 and, consequently, the set of claws 42 coact, on one hand, with an eccentric or cam 44 rotated, by a chain wheel 47 connected by a chain 48 to motor means 50, about an axle 45 mounted on the magazine bar feed frame, that cam having an eccentric shaft 49 on which the lower portion of the seesaw is articulated, namely for free rotation. They coact, on the other hand, with an element 61 of the device 60, this device being arranged on one side of the seesaw and comprises a set of two levers 61, 62 (see also FIG. 6A) pivotable about an axle 64 whose ends are mounted in the frame too, one of the ends of the device 60, more exactly the lever 61, being rotatably mounted together with the seesaw 41 about the shaft 51 which is disposed within the upper portion of said seesaw. The shafts 51, 64 pass into a supporting piece 61A disposed at the other side of the seesaw 41. This piece 61 corresponds to the lever 61. In a general manner, it will be fully evident to the one skilled in the art that the elements such as the cam 44 and the wheel 47 are respectively arranged on both sides of the seesaw (even if our considerations will be limited here, for sake of simplification, to only one side of the seesaw).

It will be noticed that the rotating motion of the eccentric 44 can be effected in clockwise direction (negative direction) or in counterclockwise one (positive direction), depending upon the position of the observer.

The perspective views of FIGS. 4B and 4C are analogous to those of FIG. 4A (and they do not contain all reference numerals), excepted that, in FIG. 4B, it can be seen that the bar 27 is taken up and carried by the set of claws 42 and that, in FIG. 4C, the same bar 27 is laid down onto the bench 22, the cam having driven the unit formed by the seesaw 41 and the claws 42 in a movement whose particulars will be explained later below.

Figure 4D:
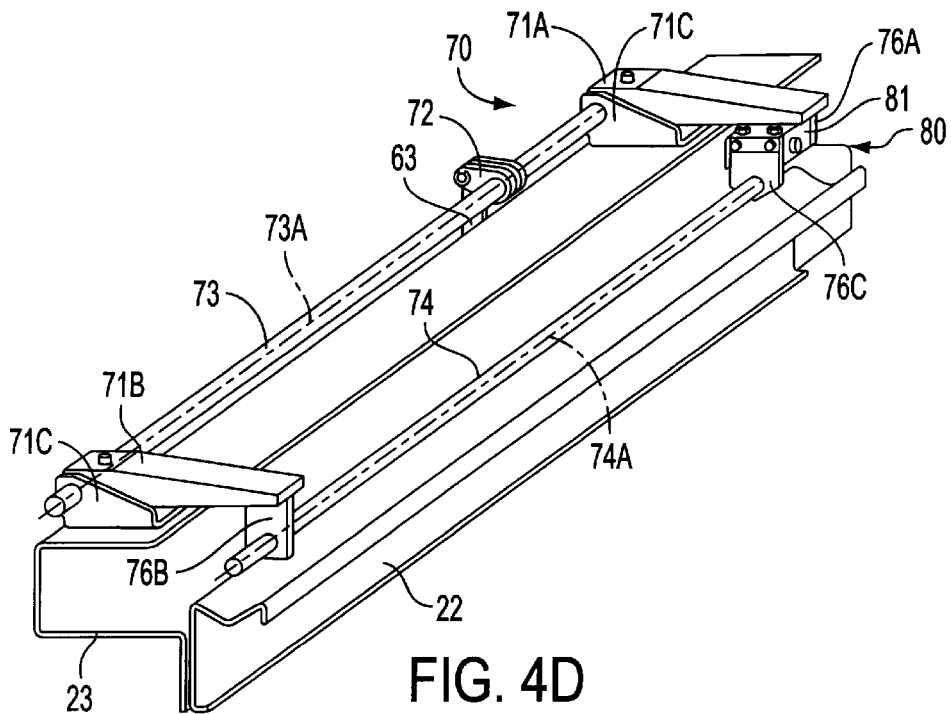
FIG. 4D is another perspective view of the feeder according to an embodiment of the invention, the engine not shown.
Figure 4E:
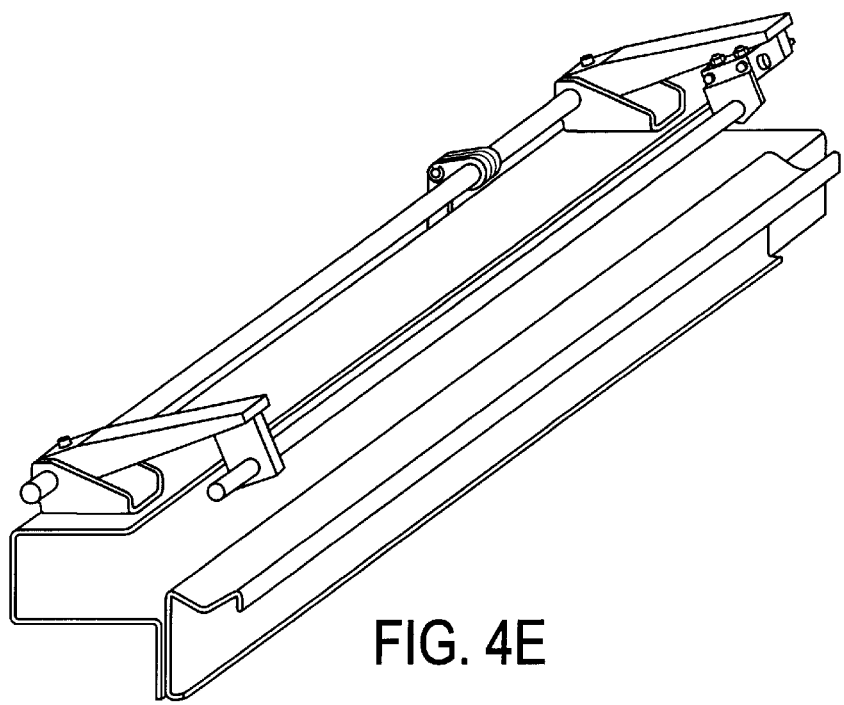
FIG. 4E is another perspective view of the feeder according to an embodiment of the invention, the engine not shown.

Before that, the device 70 alone is shown in a greater scale in FIGS. 4D, 4E, namely in lower and higher positions respectively; the functioning of the whole will be explained below. It is mentioned here that the stirrups 71A, 71B are journalled pivotably about a shaft 73A of a lever rod 73 which is rotatably connected to said stirrups. The rod 73 is further integral with a lever 72 that passes into borings (not referenced) of mounting bases 71C fastened to the conduit 23. The stirrups 71A, 71B carry the thrustor rod 74 via a thrustor guide 76B, fastened to the stirrup 71B, the thrustor 74 being able to slide within a boring (not referenced) in that guide 76B, on one hand, and via a thrustor support 76A, fastened to the stirrup 71A, and a thrustor support 76C, fastened according to the shown Example to a latching block 81, on the other hand, the unit 76C, 81 being able to get integral with the thrustor support 76A or being uncoupled therefrom. In the low position, the axis 74A of the thrustor 74 is situated in the prolongation of the lathe headstock axis.

Figure 6A:
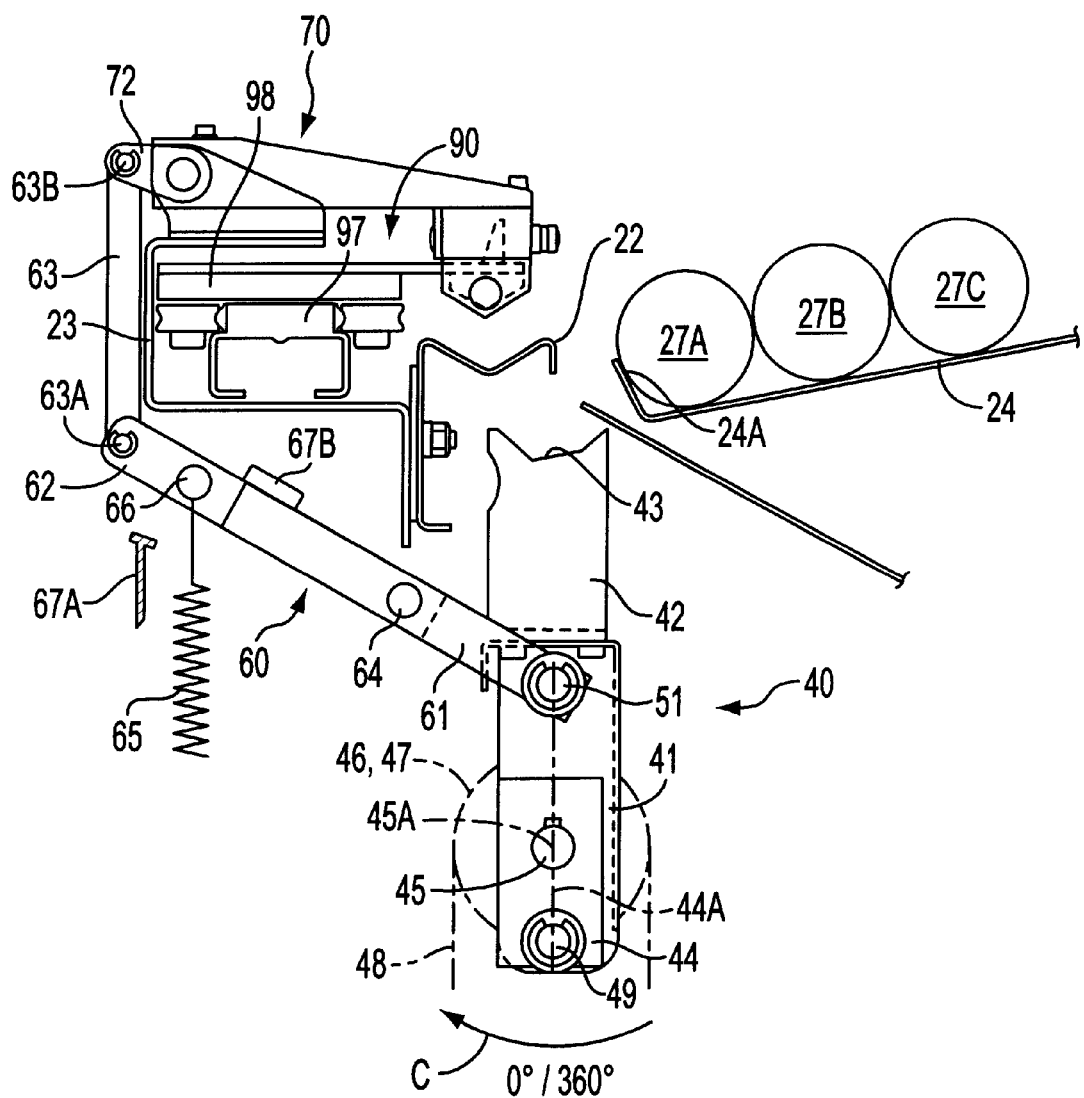
FIG. 6A is a front view showing the movement of the loading/unloading device and of the long advance module, during loading.

FIG. 6A shows a defined position of the device 40, called 0°/360°, with reference to an angle a whose signification will be given below with reference to FIG. 6B. For explanation purposes, this position is considered as a starting position, as well as that taken by the means appertaining to the bar advance device.

In this FIG. 6A, one distinguishes anew, this time as a front view, the loading/unloading device 40, the long advance device formed by the modules 70 (thrustor) and short (flag) 90, these two modules being able to be coupled or being independent from each other, thanks to means which will be described later, and also the device 60 and the connecting rod that connects the device 40 to module 70. Moreover, the understanding of the mechanisms is made easier when, using the reference numerals, FIG. 6A is compared with FIGS. 4A, 4D (or 4E) and 5.

As it has already been pointed out, the device 60 comprises two levers 61, 62 rotatable about the axle 64. The connecting or distance rod 63 is connected by its lower end to the upper end of lever 62 by a pivot 63A, and by its upper end to articulating lever 72 by a pivot 63B. In the shown Example, the axle 64 passes through the lower end portion of lever 62 and about through the center of lever 61.

The lever 62 also coacts with an elastic element 65 working as a pulling device and which is connected to said lever at its upper end by a retention rod 66, the other end of this element being fastened to the mounting base of the frame. In the shown position (the eccentric shaft being in its lowest position), the lever 61 abuts against a stop 67B fastened to the lever 62. Finally, a tappet 67A can be seen onto which lever 62 can come to rest.

From the 0°/360° position mentioned above where the axis 44A, that is the axis going through the centers of spindles or shafts 45 and 49 and which, according to the present Example, is at the same time the symmetry axis of the eccentric 41 and the vertical axis 45A of the driving shaft 45 (a key, not referenced, can be seen which assures the connection in rotation) which is situated within the same vertical plane, a rotation in negative direction (direction of arrow C) will be transmitted to pinion 47 (symbolically shown by a dashed line) by the chain 48 (also symbolically shown by a dashed line), in order to load a first bar 27A (which is now in waiting state together with other bars 27B, 27C, etc. on the hopper 24) onto the bench 22.

This rotational movement during which the center (not referenced) of the eccentric axle 49 describes a circle path 46 (symbolically drafted in a fine dashed line, superimposed on the schematical representation of pinion 47) will now be decomposed into several phases in such a manner that the operations of loading said bar on said bench will easily be understood, phases wherein the claws (and the seesaw) describe a firstly ascending and then descending movement.

Figure 6B:
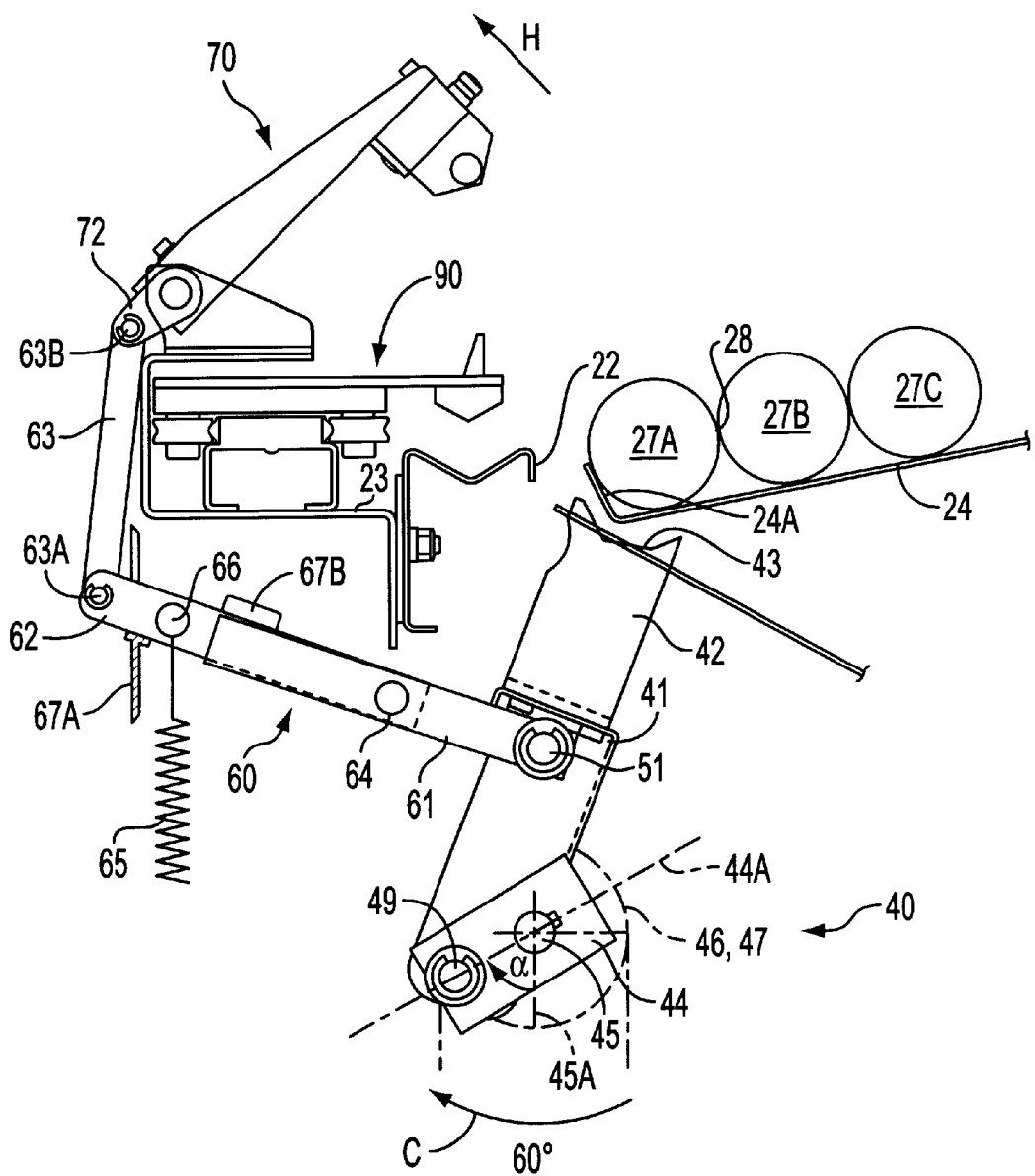
FIG. 6B is a front view showing the movement of the loading/unloading device and of the long advance module, during loading.

FIG. 6B shows a position of the device where the angle α formed by the two shafts 44A, 45A is 60° in the shown embodiment (after rotation in the direction of arrow C). It is evident that, in function of the construction particularities of the device and/or device 60, this angle—more generally $\alpha_1$—may be superior or inferior to 60°.

In this position $\alpha_1$, thus 60° in this Example, the unit claw 42/seesaw 41 is inclined against the right in a manner as to become nearly opposite to the bar 27A.

During the rotation from an angle α of 0° until the angle of 60°, the cam or eccentric 44 drives, via the shafts or axles 49, 51, the levers 61, 62 rotatably mounted about the shaft 64, and this allows the progressive upward uncoupling of the module 70 (arrow H) under the effect of the spring 65, until the lever 62 is locked in its path (when α=60°) since the latter abuts against the tapper 67A (it can also be seen that the extremity of the lever 61, located opposite to the stop 67B, begins to disengage from the latter).

Figure 6C:
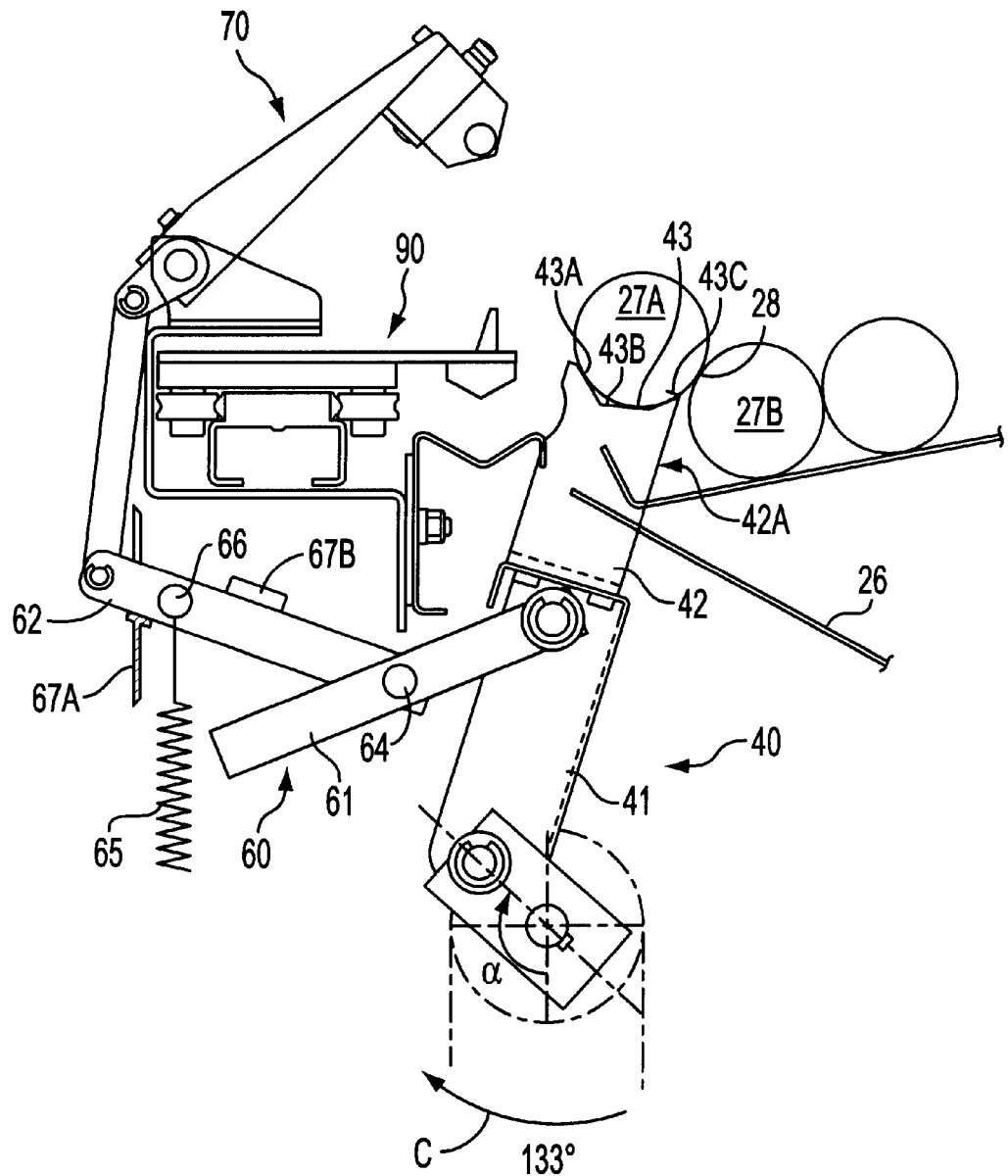
FIG. 6C is a front view showing the movement of the loading/unloading device and of the long advance module, during loading.

In FIG. 6C —a position of 133° (the angle α being now 133°, rotation in the direction of arrow C) —, the set of claws 42 carries the bar 27A which rests on a seat 43 of each claw. The particular shape of this three-plane pan 43A, 43B, 43C of different lengths (in the sense of this view) is such that it allows an optimal holding under all circumstances. In fact, the bar taken up by the claws must remain wedged in the seats 43 in spite of the push exerted on it by the bar or the bars stored behind it on the hopper 24 (bars 27B, 27C, etc.). Furthermore, this wedging must be assured for all usual bars for whose loading the magazine bar feeds are provided, and this during the total loading path starting from the hopper 24 until the bench 22, and the unloading motion starting from the bench 22 to an inclined discharging plane 26 (which will be described below).

It is to be reminded that the hopper 24, as well as the bench 22, are provided with indents or slots for allowing the free passage of the claws.

The taking up of the bar 27A by the claws 42 occurs when the angle α is about 60° (slightly higher than 60° in the present Example); during the following movement, the bar 27B will be displaced downward under the effect of gravity but still remaining in pressure rest to the first bar 27A all along successive generating lines or rest lines 28.

For illustration purposes, it can be seen in FIG. 6C (position of 133°) that the set of claws 42 has seized a bar 27A, that the bar 27B has progressively been lowered, and that the movement of the whole (41, 42) continues, whereas the free displacement of the bar 27B under its own weight and under that of all following bars, is hindered.

Figure 6D:
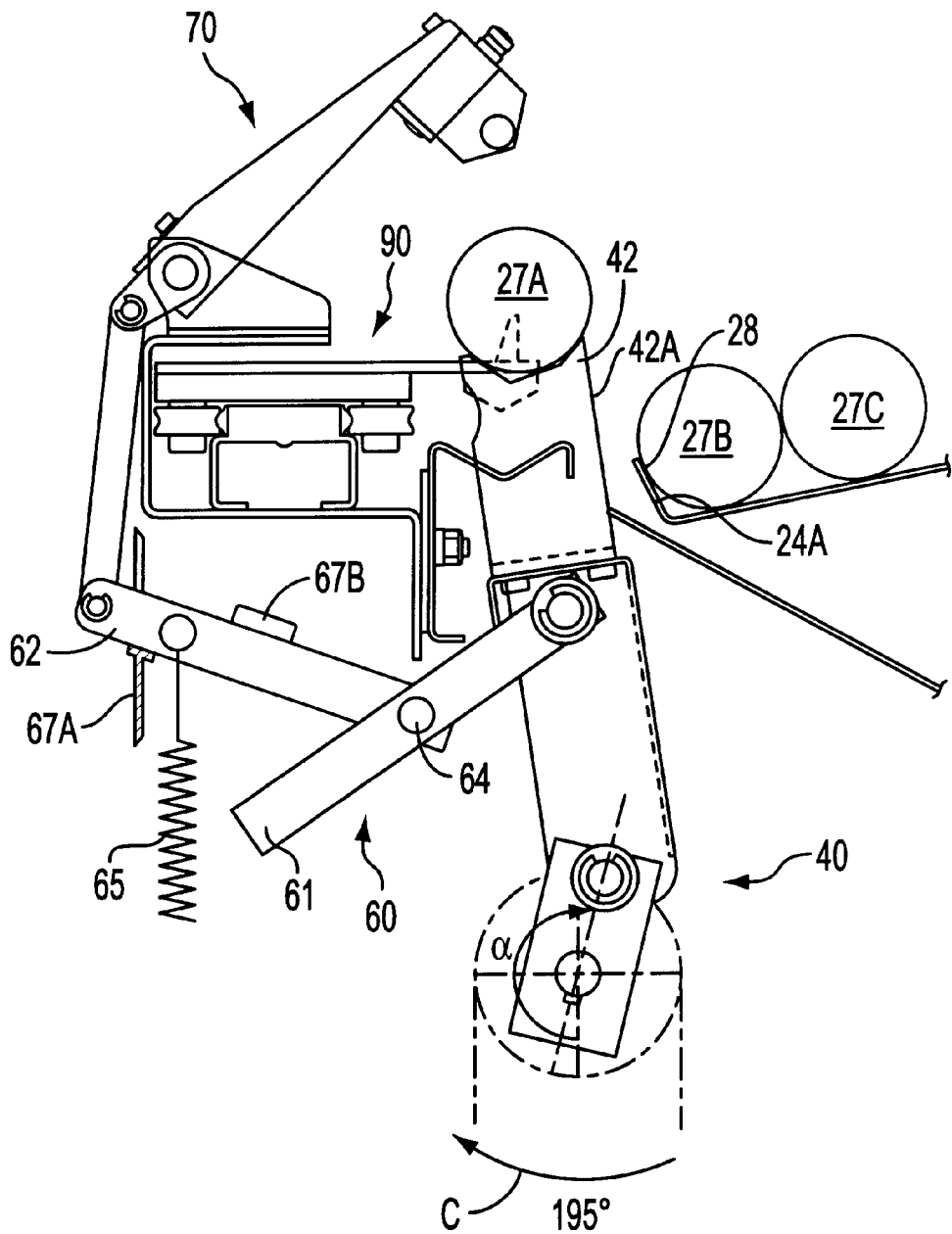
FIG. 6D is a front view showing the movement of the loading/unloading device and of the long advance module, during loading.

The cam 44 then continues its rotation in the negative direction, so that the unit 41, 42 together with the bar 27A comes into the position of 195°, shown in FIG. 6D. During the movement occurring between the positions of 133° and 195°, the rest line 28 of the bar 27B against the bar 27A has "smoothly" and progressively passed against the rear flanks 42A of the claws 42.

In an analogous manner, the rest line 28 of the bar 27B against the flanks 42A has passed, one more again smoothly, to the shoulder 24A of the hopper 24.

The rotational movement of the cam 44 continuing and beginning a descending motion, the unit 41, 42 comes into a position $\alpha_2$ wherein $\alpha_2$ is equal to 315°, according to the Example described (FIG. 6F), after the bar 27A had been laid down onto the bench 22 (the same observations as those made with respect to the angle $\alpha_1$, apply here too, in considering the necessary changes). As it can easily be imagined in examining FIG. 6E, showing the position of 255°, this laying down is also effected "smoothly".

In a general manner, it can be said that the loading cycle occurs during the passage of angle α from $\alpha_1$ to $\alpha_2$.

In this manner, the two shocks described in the discussion of the prior art devices, namely that provoked on the shoulder 24A of the inclined plane hopper 24 by the bar or the series of succeeding bars against the bar taken up by the claws 42, as well as the shock provoked by the fall of the bar onto the bench, are fully avoided.

Figure 6E:
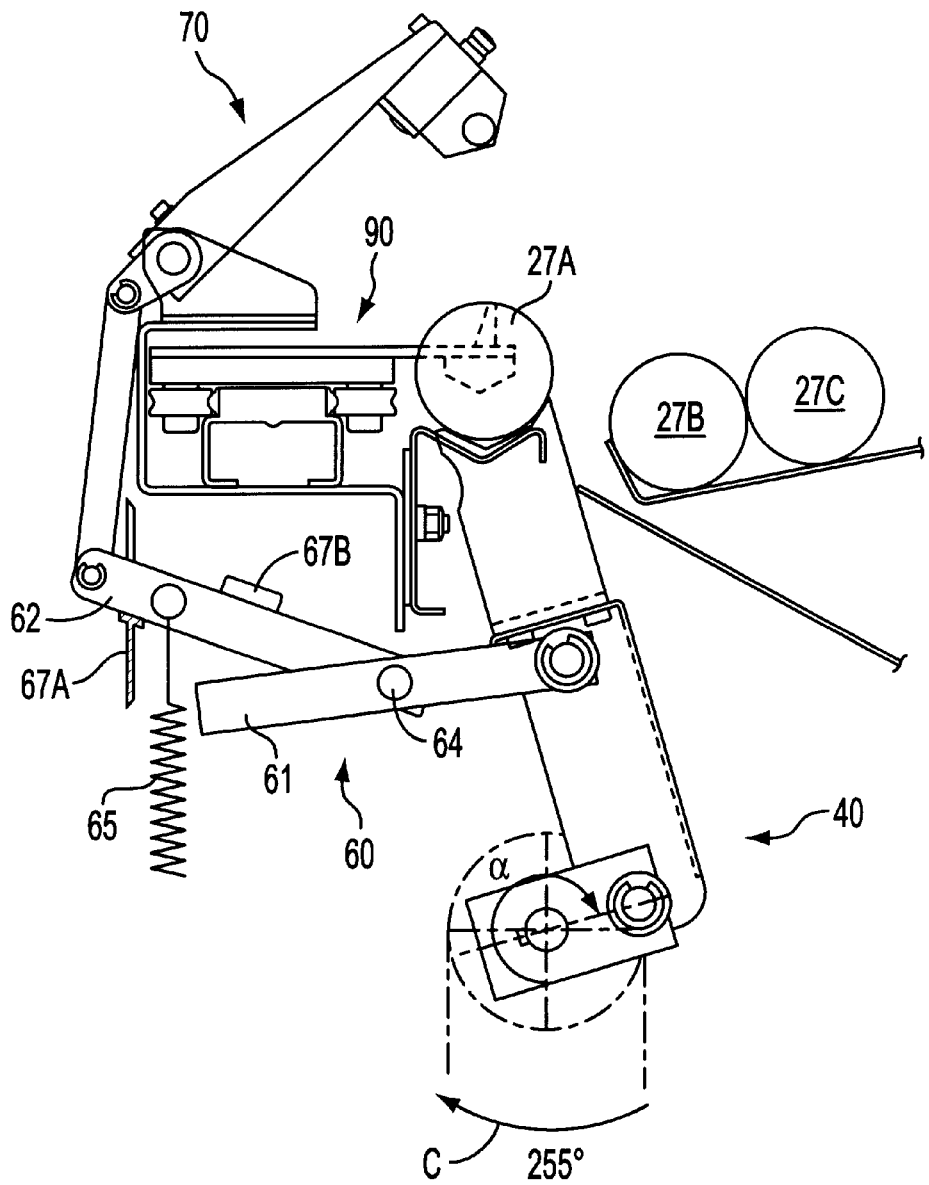
FIG. 6E is a front view showing the movement of the loading/unloading device and of the long advance module, during loading.
Figure 6F:
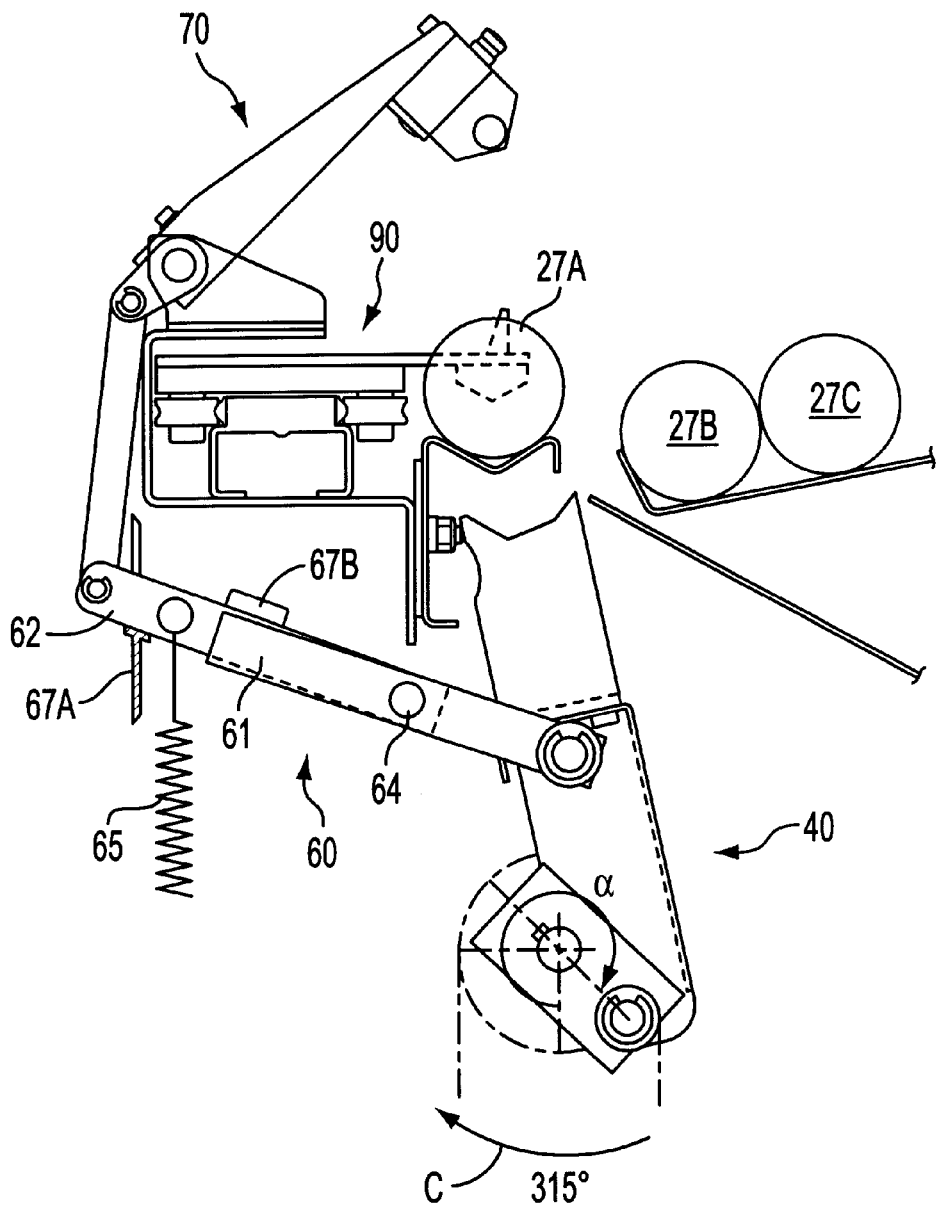
FIG. 6F is a front view showing the movement of the loading/unloading device and of the long advance module, during loading.

It can be seen that in FIG. 6A (position of 0°/360°), the module 70 is in its low position whereas in FIGS. 6B and 6F (positions of 60° to 315°), it is maintained in high position, the lever 62, pivotable about the shaft 64, having remained in abutment against the tapper 67A under the effect of the spring 65, whereas the lever 61, pivotably journalled about the shaft 64 too and following the movement of the seesaw 41 to which it is connected by the shaft 51, has disengaged more and more from the stop 67B (FIGS. 6B to 6D) and has come back to the latter (FIGS. 6E and 6F). In other words, the long advance module 70 coacts with the loading/unloading devices 40, 60 through the lever 61 which constitutes simultaneously an element of the device 40, on one hand, and the lever 62 and the rod 63, on the other hand. Therefore, the movements of this device and those of the module 70 which passes from a low position into a high one and vice versa, are combined with each other.

It should be added that, during the operation of the device 40 which causes the operation of the device 60, the shafts or spindles 45 and 64 are fixed whereas the shafts 49 and 51 are mobile.

The device 40 is further unique since it allows not only the loading but also the unloading without the faintest shock on the elements of the magazine bar feed.

Figure 7A:
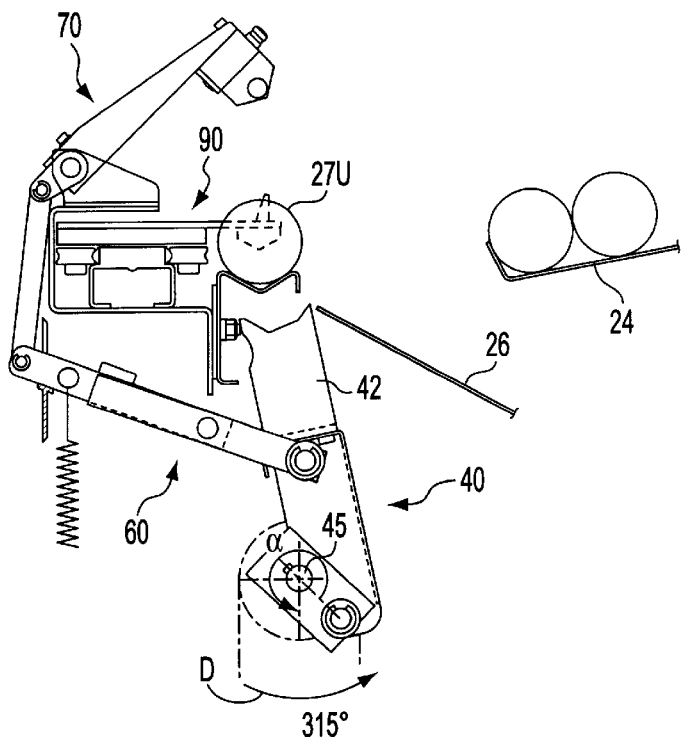
FIG. 7A is a front view showing a movement of the loading/unloading device and of the long advance module, during unloading.

From the position of 0°/360° (module 70 low, see FIG. 6A), the cam 44 is now made to rotate about the driving shaft 45, this time in the positive direction, until the device 40 arrives in the position of 315° shown in FIG. 7A (rotation in the direction of arrow D), the advance module 70 being brought back into the high position. The position $\alpha_2$=315° in FIG. 7A is equivalent to that shown in FIG. 6F except that the hopper 24 has been retracted by means of a known, not shown device. The set of claws 42 is essentially opposite to a machined bar 27U which is to be seized. Moreover, the movements of the device 40 and those of the device 70 are combined in a manner equivalent to that described for the loading operation. The bar 27U has been replaced on the bench 22 according to a process which will be described below with reference to FIG. 9.

Figure 7B:
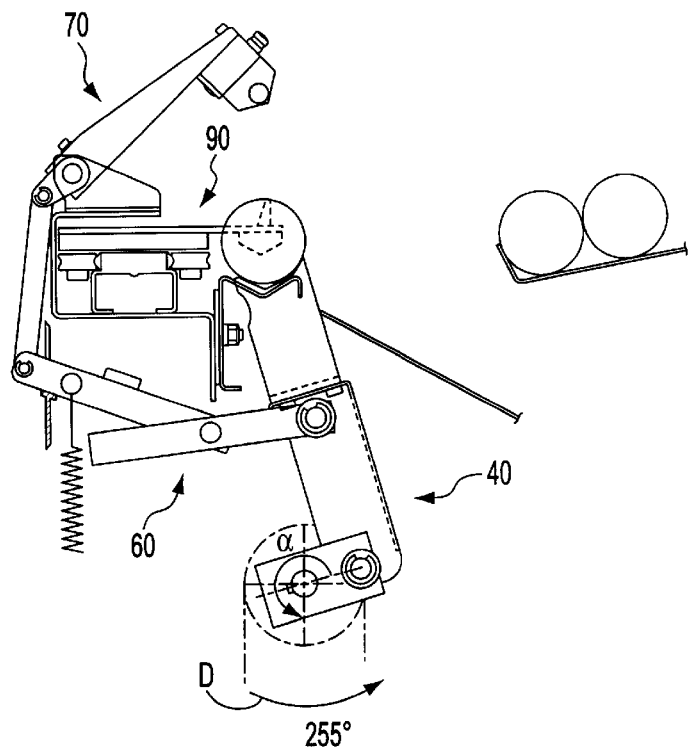
FIG. 7B is a front view showing a movement of the loading/unloading device and of the long advance module, during unloading.

In the position of 255° in FIG. 7B, the rotation of the cam 44 in the positive direction of arrow D continues. The bar 27U has been lifted by the set of claws 42.

Figure 7C:
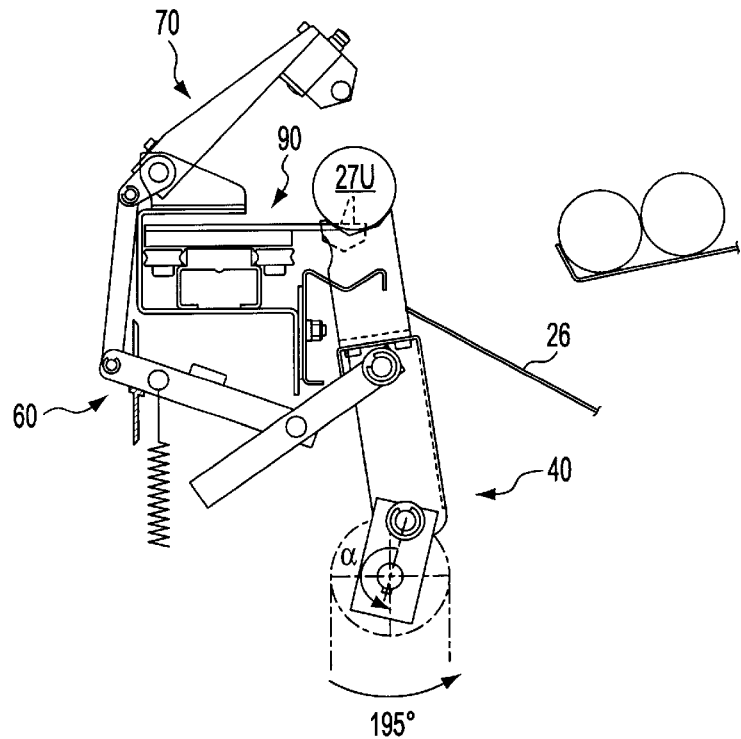
FIG. 7C is a front view showing a movement of the loading/unloading device and of the long advance module, during unloading.
Figure 7D:
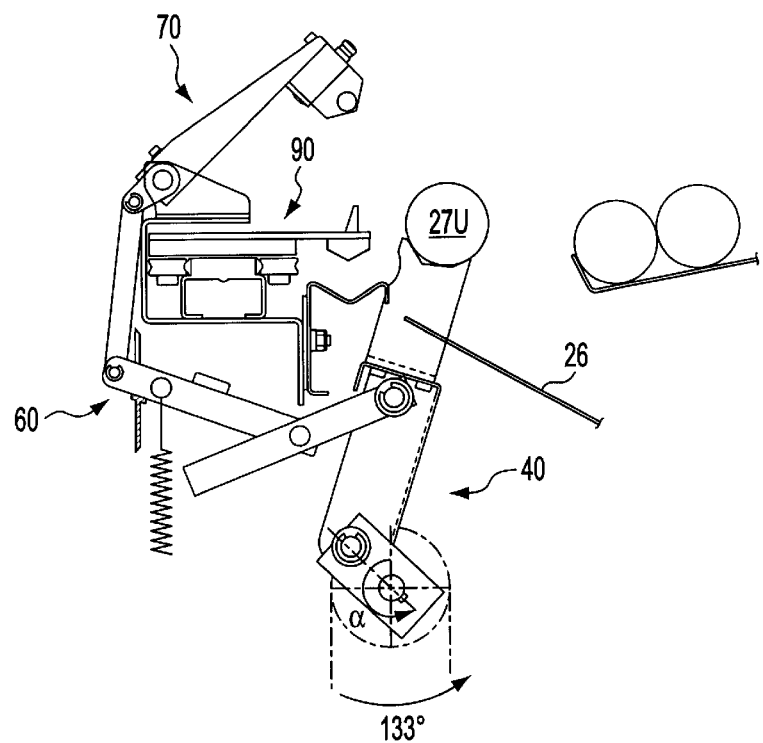
FIG. 7D is a front view showing a movement of the loading/unloading device and of the long advance module, during unloading.
Figure 7E:
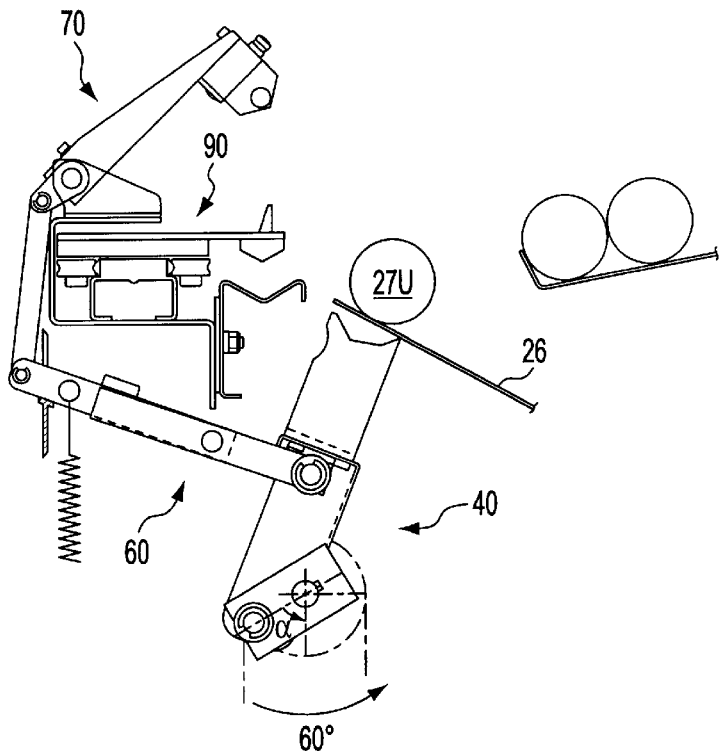
FIG. 7E is a front view showing a movement of the loading/unloading device and of the long advance module, during unloading.

It can be seen in FIGS. 7C, 7D and 7E that said bar is transferred to the inclined unloading plane 26, the cam 44 transmitting a movement to the unit 42, 41 exactly inverse to that which has been described above in detail with respect to the loading operation, and it is deemed unnecessary to repeat it here once more again.

It is under these conditions that the laying down of the bar 27U onto the inclined plane 26 is carried out "smoothly", following the position of $\alpha_1 = 60°$ (FIG. 7E)

In a general manner, it can be said that the unloading cycle occurs during the passage of the angle $\alpha$ from $\alpha_2$ to $\alpha_1$.

Figure 7F:
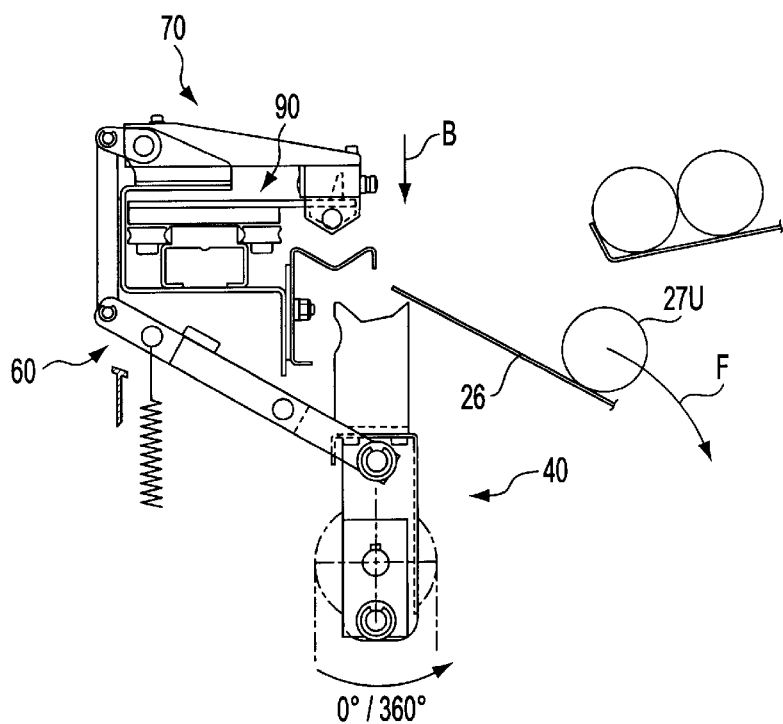
FIG. 7F is a front view showing a movement of the loading/unloading device and of the long advance module, during unloading.

The set of claws 42 disengages now from the inclined plane 26 which comprises, in the same manner as the hopper 24, indents or slots (not shown and not referenced) for allowing the free passage of said claws. The device will arrive in its position of 0°/360° (FIG. 7F) whereas the machined bar 27U rolls down the plane 26 for being recovered (arrow F), and the module 70 goes in low position (arrow B). It can be furthermore noticed that, during the unloading movement of a machined bar, the devices 40, 60 and the module 70 take each time positions that are equivalent to those occurring during the cycle of loading a bar.

Figure 8A:
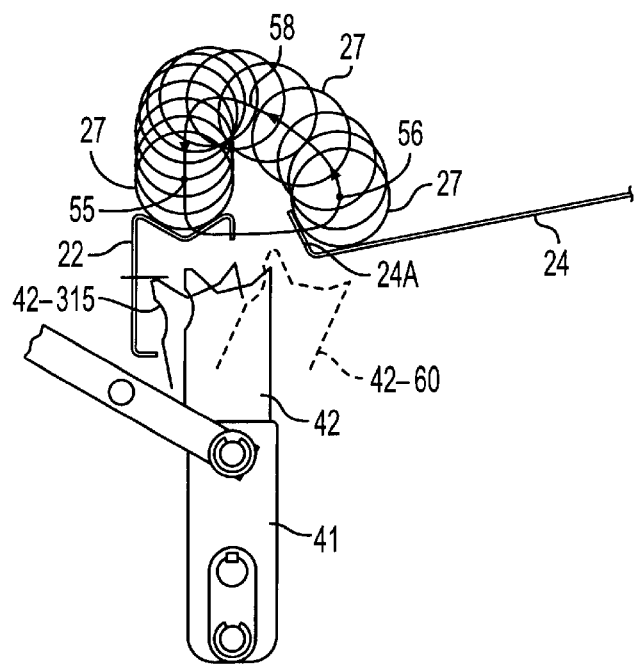
FIG. 8A shows the characteristic curve described during loading.
Figure 8B:
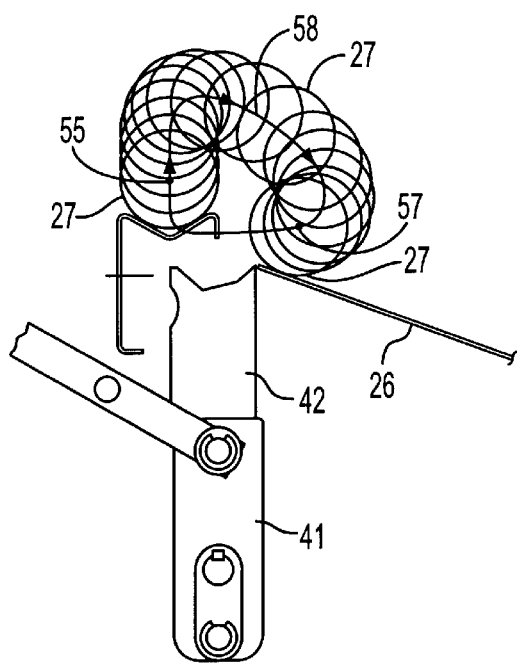
FIG. 8B shows the characteristic curve described during unloading.

FIGS. 8A and 8B show the curve described by the center of any bar 27 during its loading onto the bench 22 from the hopper 24, and during its unloading from the bench 22 onto the plane 26.

More precisely, regarding the loading (see FIG. 8A), this curve starts from point 56 (the center of the bar 27 when it is to rest against the shoulder 24A of the hopper 24) and finishes its movement at point 55 (the center of the same bar when it is to rest on the bench 22) in the negative direction according to the arrow. The section of the curve going from point 55 to point 56 (always in the negative direction) is that which would describe that center when the bar were laid down on the claws 42 between the position of 0°/360° and all intermediate positions taken by the set of claws until the seizing of the bar at the hopper 24, on one hand, and all intermediate positions taken by this claw set from the laying down the bar onto the bench 22 until the position of 0°/360°, on the other hand. By means of illustration, FIG. 8A shows in dashed lines two intermediate positions of the claws 42, referenced as 42–60 (position of 60°) and 42–315 (position of 315°).

In an analogous manner, regarding the unloading operation (see FIG. 8B), the curve starts from point 55 (the center of bar 27 lying on the bench 22) and finishes at point 57 (the center of the bar just laid down on the inclined plane 26), in the positive direction of movement indicated by the arrow. Respective to the explanation of the section of the curve going from point 57 to point 55 (always in the positive direction), the description given above for the loading operation can be used in applying the necessary changes.

It can be seen that the curve 58 which results from the operation of the device 40 presents a characteristic and original petaloid form.

It should finally be added that the speed of the movement which generates the curves 58 is preferably but not necessarily uniform. In fact, it may easily be programmed in such a manner that it is relatively slow in the regions of points 55, 56 and 57, and relatively quick on the paths that separate these regions.

Furthermore, it should be repeated that the bench 22 is adjusted in such a manner that the center 55 and, consequently, the axis of the bar, is situated on the axis of the lathe headstock. It is interesting to observe also that, during the operations of loading and unloading a bar, the bench 22 is not subjected to any movement whatsoever.

Of course, the means described above that comprises the loading/unloading device 40 are preferential ones allowing to attain the contemplated results, namely, the elimination of shocks, in a simple, purposeful and economic way. It is evident that the one skilled in the art, starting from the described non-limiting embodiment, may easily deduct other embodiments and realizations. Such a variant would be, for example, to seize and disengage the bar to be machined from the hopper by the application of seizing means at each end of the bar (for example arms which exert contrary forces, directed towards the center of the bar and applied to its ends), these means transporting and laying down in a smooth manner the bar on the bench 22, whereas retention fingers which are retractable under the hopper 24 appear through slots made in the hopper in order to slow down the following bar or bar series, to accompany the bar during the rolling down the inclined plane, and to make it slowly advance against the shoulder of the hopper, thus avoiding any shock, and the fingers will then progressively be retracted.

In order to unload a machined bar (reference 27U above), it is of course indicated to transport this bar before-hand from the machine tool on the V-shaped bench 22 where the bar is seized by the set of claws according to the above described process.

Figure 9:
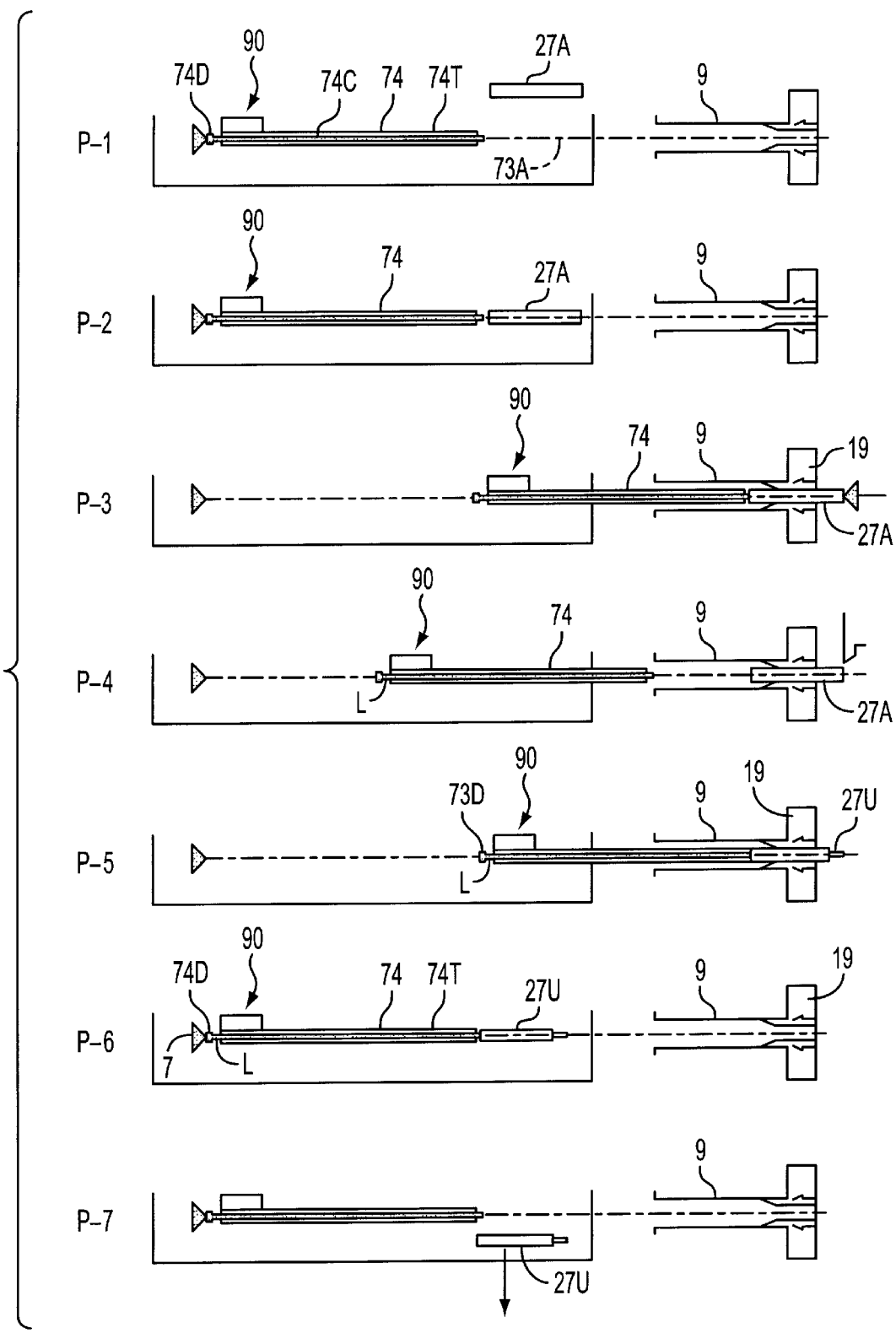
FIG. 9 schematically shows the loading/unloading phases of a bar to be machined at one of its ends.

FIG. 9 shows seven phases not only of the unloading operation but also of the loading of the bars which should be machined at one extremity only.

During phases P-1 and P-2, the bar 27A passes from the hopper to the bench (elements not referenced here) and is then introduced into the headstock 9 of the lathe, the leading end emerging from the mandrel 19 with a preselected length (P-3).

During phase P-4, the thrustor rod is retracted from the headstock by means of the module 90, the jaws of the mandrel are closed, and the bar is machined.

The operation of retracting the machined bar (that carries now the reference numeral 27U) is the object of phases P-5 and P-6.

It should first be noted that the thrustor rod 74 comprises a tube 74T and in its interior an element 74C called nail, provided at the rear of a head 74D. This head emerges from the rear portion of the tube over a distance 1 during phases P-1 to P-4, the tube being able to be coupled to and uncoupled from the advance module 90.

The tube 74T (selected according to the diameter of the bars to be machined) has a slotted front portion.

During the phase P-5, the bar 27U stays maintained within the mandrel 19, the tube 74T is driven forward by the action of the module 90, in such a manner that the slotted front portion of the tube 74T goes over the rear portion of the bar 27U in order to take the latter by gripping and exert a pincers action due to the elasticity of the slotted front portion of the tube 74T. During this operation, the distance separating the head 74D from the rear end of the tube 74T passes from l to L.

The thrustor rod 74 is then driven towards the rear after the opening of the jaws of the mandrel, and it carries with it the bar 27U for laying it down onto the V-shaped bench. The bar is then disengaged, the device 90 continuing to apply a retracting movement to the tube 74T, whereas the head 74D comes to rest against a stop 7, in such a manner that the slotted front portion of the tube 74T is disengaged from the bar 27U, the distance separating the head 74D from the rear end of the tube 74T passing anew from L to l.

The bar 27U is then unloaded (phase P-7) under the conditions described above.

The mode of advancing a bar will now be described in detail, namely the transportation of the bar from the magazine bar feed towards the lathe for being machined there in its totality, according to the example, until a minimum of clipping. This advance is effected in two steps and implies a cooperation between the modules 70 and 90 in the center of which means are arranged allowing the coupling and the uncoupling of the modules, and which constitute also an important and original propriety of the invention, allowing to overcome the drawbacks discussed in the introduction of the present document. As it has already been stated above, these means are advantageously constituted by a locking/unlocking device. The invention permits also to use only one and the same element for activating the modules 70, 90, namely the elements of these modules intervening in the pushing of the bars.

Figure 10A:
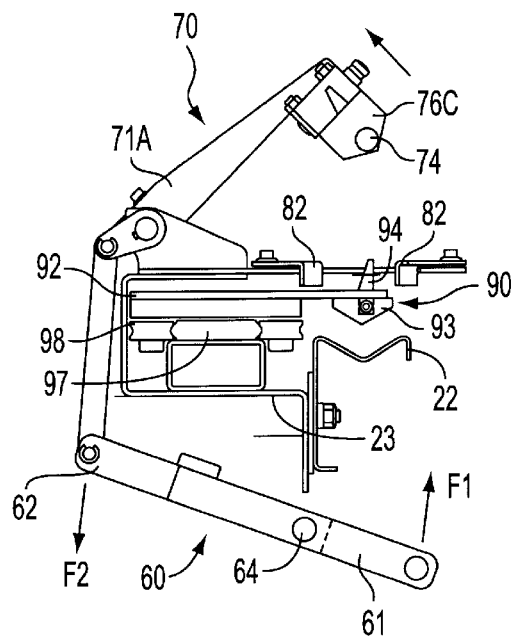
FIG. 10A shows a front view of the short and long advance modules in all positions between 60° and 315°.
Figure 10B:
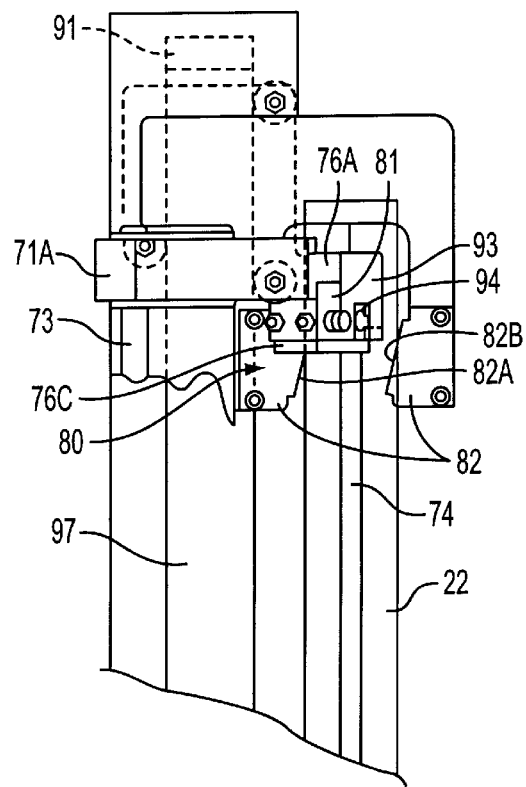
FIG. 10B shows a partial elevation view of the short and long advance modules in all positions between 60° and 315°.

FIGS. 10A and 10B show the positions and dispositions occupied by the modules 70, 90, seen from the front and from below (partially) when the device 40 goes from the position of 60° to that of 315° which is shown in FIGS. 6B to 6F or 7A to 7E and explained there. It is known that in the corresponding time intervals a loading cycle or a unloading cycle of the bars occur. Arrows F1, F2 symbolize the forces to which the levers 61, 62 of the device 60 are submitted.

FIGS. 10A, 10B show the module 70 with the stirrup 71A (the stirrup 71B to which the thrustor guide 76B is fastened, can be seen in FIG. 4A which can be taken as an additional reference too). It is reminded that the stirrup 71A comprises in the region that is oriented towards the exterior of the magazine bar feed, the thrustor support 76A fixed to the stirrup 71A and, on the side that is oriented towards the interior of the magazine bar feed, the thrustor support 76C fixed to a latching/unlatching block 81 which is part of the locking/unlocking device 80. Also, the module 90 can be distinguished (only partially in FIG. 10B) having a body 92 and a heel 93 provided with an anchoring element or tab 94, the said body being fastened on a mobile carriage 98 driven by motor means 91, and guided by a rail 97 through the intermediate of three rollers (not referenced).

The device 80 further contains a pair of sliders 82 fastened to the conduit 23 within the rear region (namely that which opposed to the region where the entry of bars into the lathe headstock is effected), on both sides of said bench. These sliders have edges 82A, 82B that are parallel to each other and oblique with respect to the axle of the thrustor 74 and oriented downwards, these shoulders having a guiding function. The gap between the edges 82A, 82B corresponds to the length of the latch 83. Other reference numerals are shown in FIG. 10B in order to facilitate the comparison with the preceding Figures, especially FIG. 4A.

It should be added that the rotational movement of the cam 44 (it has been said that its speed may be uniform or not) is continues form the position of 0°/360° to the position of 315°. In this position of 315°, the device 40 will make a stop during which the first advance of the bar 27 into the lathe headstock is effected.

Figure 11A:
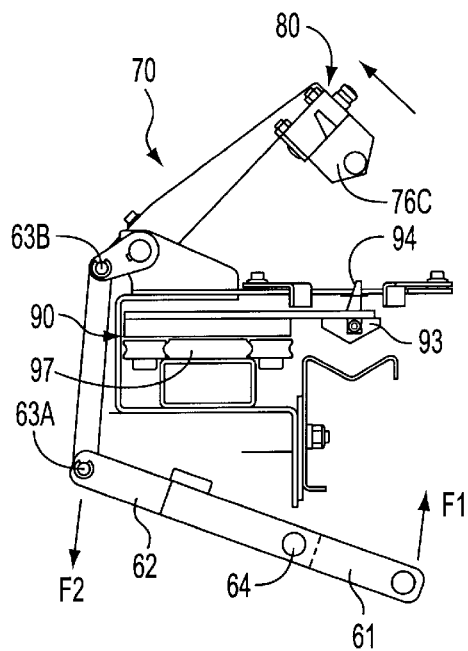
FIG. 11A shows a front view of the short and long advance modules in the 315° position.
Figure 11B:
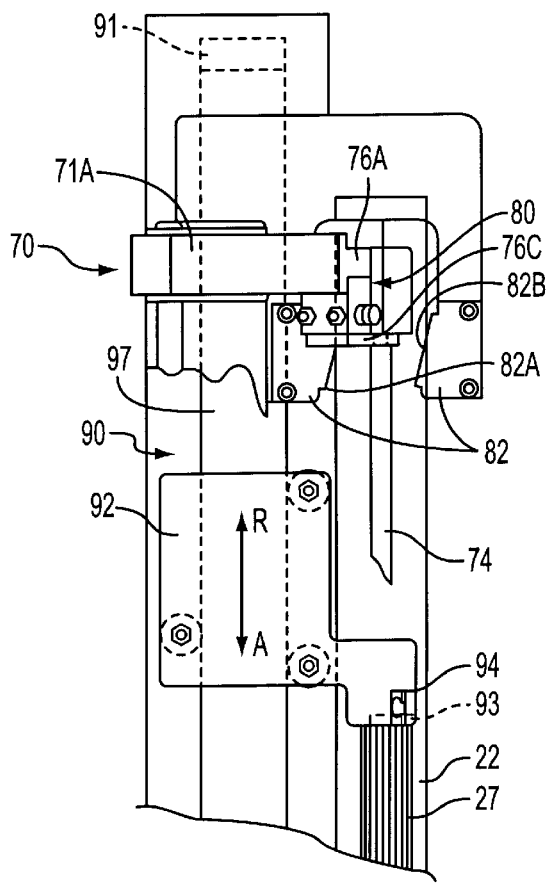
FIG. 11B shows a partial elevation view of the short and long advance modules in the 315° position.

This phase is shown in FIGS. 11A, 11B. As it can be seen especially in FIG. 11B, the module 90 is at a moment t during its advance displacement (namely towards the lathe headstock, arrow A), driven by the motor 91, the heel 93 pushing the bar 27 laid down on the bench 22.

When the advance is completed, namely when the bar 27 is totally disengaged from the bench 22 (and is thus situated within the headstock of the lathe, and protrudes optionally in part from the locking mandrel), the flag 90 is retracted rearward (arrow R) until the position that it has occupied before, namely that which is represented in FIG. 10B.

Figure 12A:
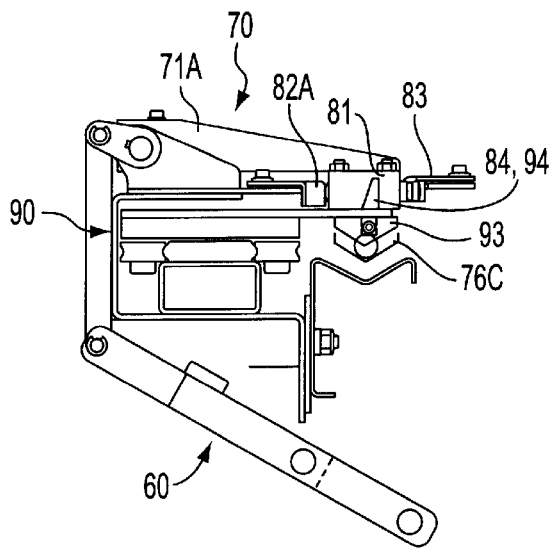
FIG. 12A shows a front view of the short and long advance modules in the 0°/360° position (long advance module locked)

At this moment, the module 70 will go into the low position (FIGS. 12A, 12B) so that the paw 94 penetrates into a lodging 84 of the latching block 81.

Figure 12D:
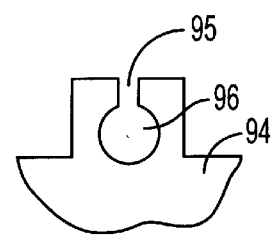
FIG. 12D shows an elevational side view of the paw.
Figure 12B:
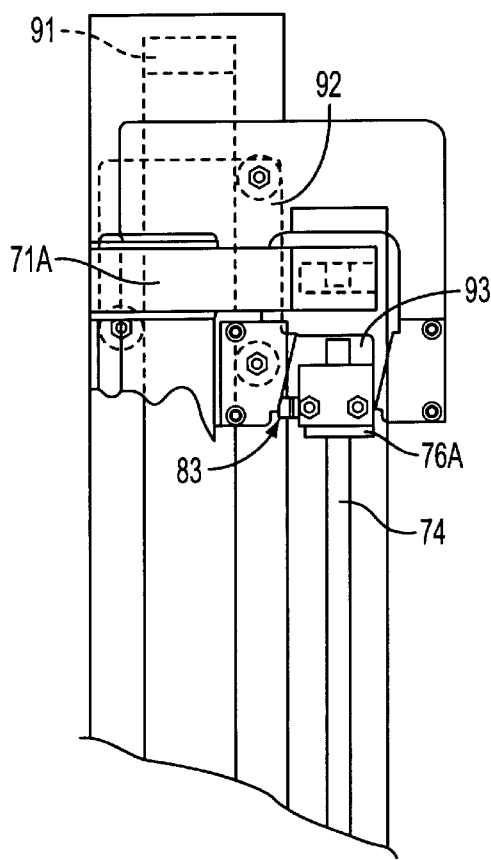
FIG. 12B shows a partial elevation view of the short and long advance modules in the 0°/360° position (long advance module locked)
Figure 12C:
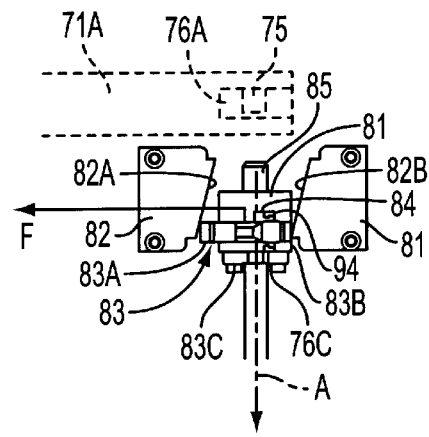
FIG. 12C shows a schematic view of the latch and its orientation during the advance motion.

It can be seen that this block 81 comprises a latch 83, represented in more detail in FIG. 12C (which further shows, in dashed lines, the stirrup 71A, uncoupled from the block 81 and from the element 76C). The latch has the shape of a cylindrical rod comprising three portions or stages, namely two outer portions 83A, 83B having a diameter D1, and a central portion 83C having a diameter D2, said rod being slidable within a corresponding bore (not referenced) of the block 81. The latch is oriented orthogonally with respect to the axis of the thrustor 74.

Furthermore, the paw 94 comprises a boring 96 having an upward slot 95 as it can be seen for example in FIG. 11B and in more detail in FIG. 12D (elevational side view of the paw in greater scale). The diameter of the boring 96 corresponds to diameter D1 of the external portions 83A, 83B of the latch 83, and the opening of the slot corresponds to diameter D2 of the central stage 83C of said latch, with a very small play of the boring 96 and a slightly greater play regarding the width of the slot 95.

When the module 70 (the thrustor) has engaged the module 90 (flag) in this manner, the latter is driven forward (arrow A), taking with it the latching block 81. At the same time, and during the advance motion (see FIG. 12C), the plug comes out of the lodging 75 of the thrustor support 76A, and the portion 83B of the latch is driven home into the boring 96 of the paw 94 of the flag (arrow F) by the action of the oblique guiding planes or edges 82A, 82B of the sliders 82 (whose distance from each other corresponds of course to the length of the latch 83). The modules 70 (more precisely the unit formed by the thrustor support 76C, the thrustor 74 and the latching block 81) and 90 are thus locked together.

In this locked state, the thrustor rod 74 will carry out a defined advance motion by the action of the motor 91 driving the flag and then go back (without uncoupling), and this so many times as it will be necessary according to the desired and programmed machining operations.

Figure 13A:
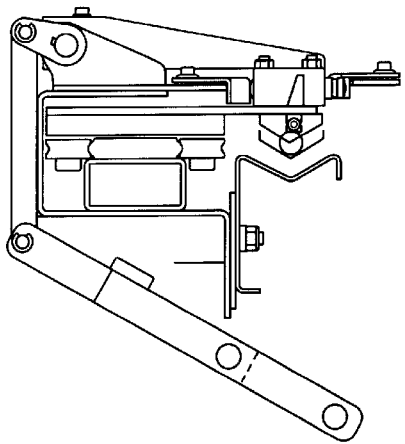
FIG. 13A shows a front view of the short and long advance modules in the 0°/360° position (long advance module unlocked)
Figure 13B:
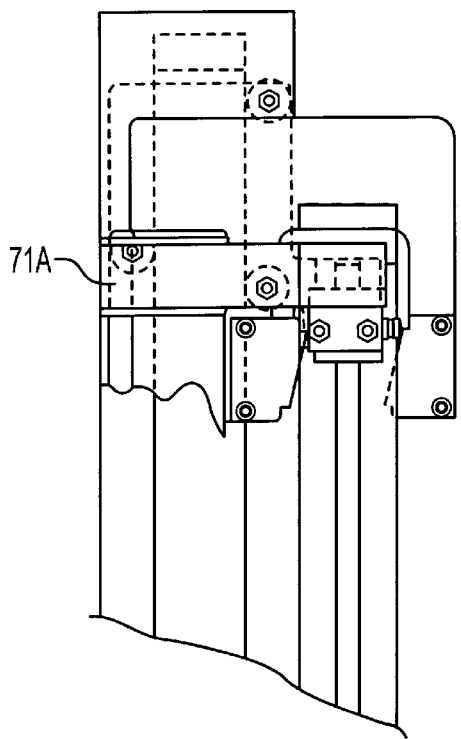
FIG. 13B shows a partial elevation view of the short and long advance modules in the 0°/360° position (long advance module unlocked)
Figure 13C:
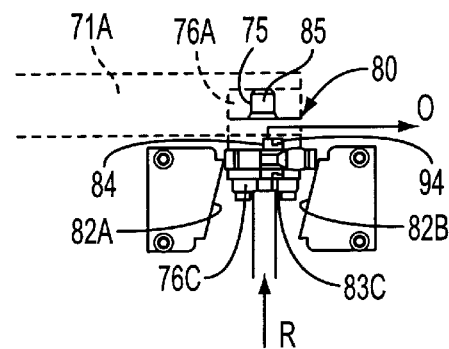
FIG. 13C shows a partial elevation view of the short and long advance modules in the 0°360° position (long advance module unlocked)

FIGS. 13A, 13B and 13C show the device 80 and the modules 70, 90 in the uncoupled state (position of 0°/360°) which should be reinstated when the machining operations are finished, on one hand, and it is desired to load the next bar from the hopper 24 onto the bench 22, on the other hand (see the explanations given above with reference to FIG. 9 when the machined bar should beforehand be extracted from the lathe by the magazine bar feed).

The flag 90 is put back into its initial or starting position (according to the sense of the arrow R in FIG. 13C); this time, the latch 83 is pushed in a direction opposite to that which has been used during the locking or latching procedure (arrow O) by the action of the guiding planes or edges 82A, 82B, in such a manner that the stage 83D having the diameter D2 of the latch 83 is placed opposite to the slot 95 of the paw 94 of the flag. The plug 85 of the block 81 goes back at the same time into its lodging 75 of the thrustor support 76A connected to the stirrup 71A.

The loading/unloading device can now be put anew into action, and the module 70 and the locking/unlocking device which are now connected once more are able to disengage from the paw 94 of the flag and take progressively the high position when the angle α has reached 60°(the high position will be maintained during the entire loading process, see above).

It can be understood that this new integrated locking device allows to improve the yield of the magazine bar feeds and can be manufactured in a simple and thus little expensive way, one and the same carriage 98 driving the thrustor 74 of the module 70 and the flag 92 of the module 90.

It goes without saying that all operations regarding the loading, the unloading and the retracting of the bars can be controlled by electronic data processing, namely by a computer, and displayed on a screen.

Figure 14B:
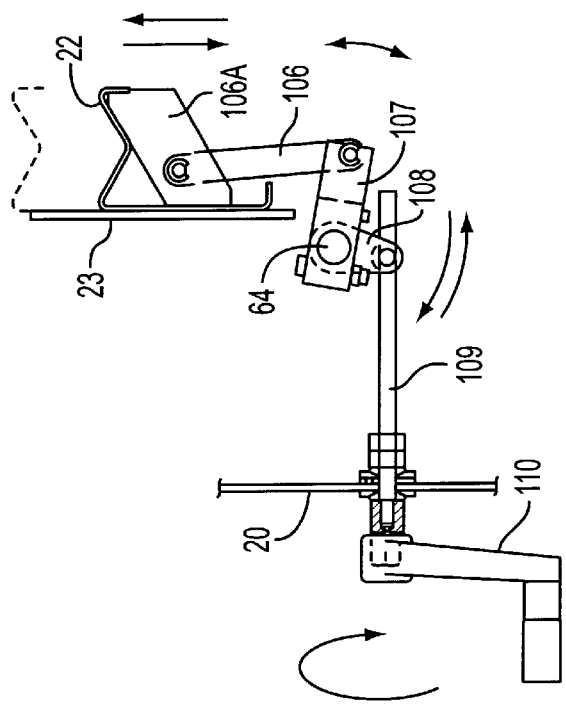
FIG. 14B shows a cross section of a bench centering device.

At last, the operation of centering the bench 22 will now be described with reference to FIGS. 14A, 14B and 14C. In fact, it is reminded that, for a given diameter of the bar, when it is laid down on the bench, its axis must have the same support as the axis of the headstock.

Figure 14A:
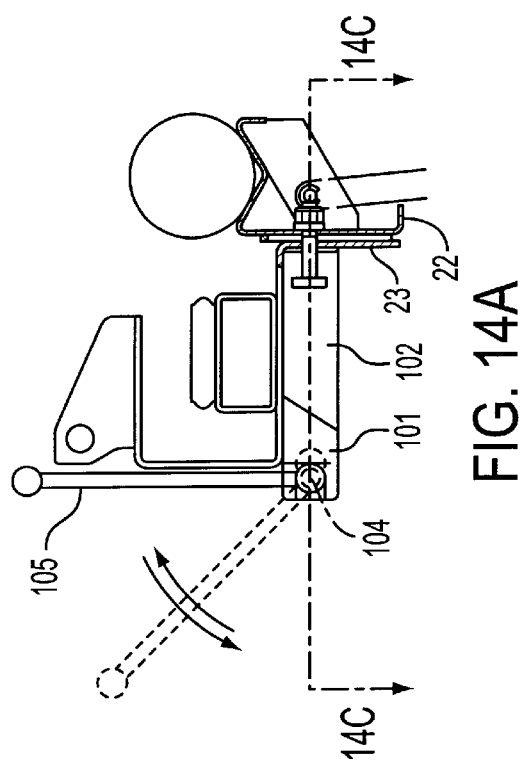
FIG. 14A shows a cross section of a bench centering device.
Figure 14C:
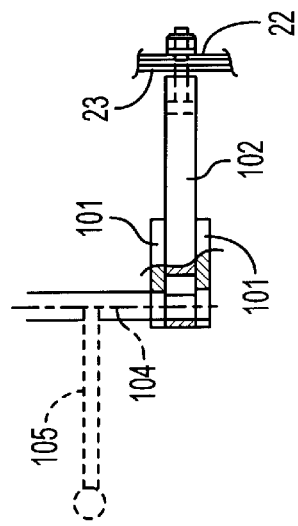
FIG. 14C shows a cross section of a bench centering device; it should be noted that FIGS. 1, 2 and 3 refer to the prior art.

FIG. 14A is a transversal cross section of the cradle in a plane going through one of the handles 105 shown in FIG. 4A (three according to the present Example). The first operation consists in uncoupling the bench from the conduit 23. This uncoupling is obtained by putting into action the three handles towards a low position (the low position of a handle 105 is shown in dashed lines in FIG. 14A). Each handle acts on an eccentric 104 (see also FIG. 14C which is a cross section according to line XIVC—XIVC in FIG. 14A). The rotation of the eccentric 104 causes the liberation of a tension rod 102 (which disengages from a stop 101) and thus the releasing of pressure from the conduit 23 on the bench 22.

The second operation, namely the very centering operation (see FIG. 14B), consists in putting into action, in one direction or the other, a crank 110 (at the left of the frame 20), thus provoking the desired raising or lowering of the bench 22. In fact, the rotation of the crank 110 and, consequently, of a screw 109, causes a rotational movement of a nut 108 and of a lever 107 about the axle 64 (which is the shaft on which the levers 61, 62 are journalled). This lever 107 acts then on the bench 22 through the intermediate of a link 106 and a reinforcement 106A.

When the desired vertical position of the bench 22 has been reached, the handles 105 are raised into their initial position whereby the pressure is reestablished, namely the effect of chucking the conduit 23 against the bench 22.

What is claimed is:

1. An automatic bar feeder device for use in a magazine bar feed comprising:
    a loading device that loads or unloads a bar from a hopper while avoiding shock exerted by said bar against an element of the magazine bar feed, the loading device being comprised of:
        a set of claws integral with a seesaw,
        a cam driven by a shaft connected to motor means and having an eccentric shaft that is connected freely rotatably at the lower portion of said seesaw, the driving shaft being able to rotate in one direction and the other, and
        a lever articulated around a fixed axle and coacting with said seesaw through a mobile shaft;
    a short advance module including a flag; and
    a long advance module including a thrustor, the short advance module and the long advance module coacting through a coupling element, wherein said flag is engageable with said thrustor;
    wherein operation of the loading device is reversible to allow the loading and unloading of a machined bar.

2. Feeder device according to claim 1, wherein the geometric locus of a point situated above any one of said claws and corresponding to the center of a bar to be loaded or unloaded is a petaloid curve when said claw starts from a given position and comes back to the same starting position.

3. Feeder device according to claim 1, wherein a first bar is seized by an upper portion of said claws; the bar is disengaged out of the hopper during a rising movement of the claws, said hopper comprising indents allowing the passage of said claws through the hopper; the bar is laid down onto a bench during a descendant movement of said claws; said first bar rests in the seat formed by said upper portion during the entire transportation movement between said seizing and said laying down; during the rising movement of said transportation, a next bar remains first to rest against said first bar along a rest line which progressively passes to the rear flanks of said claws and then from these rear flanks to a shoulder of said hopper; and during the descendant movement of said transportation, the said first bar is held back by the bench and received by the bench under which pass said claws, said bench comprising indents allowing this claw passage, said rising and descendant movements not being followed by shock.

4. Feeder device according to claim 1, wherein a machined bar is seized by an upper portion of said claws and is lifted from the bench from below in a rising movement of said claws, the bench comprising indents allowing the passage of said claws through the bench; said machined bar is laid down on an inclined receiving plane during a descendant movement of said claws, said bar remaining in the seat formed by the said upper portion during the entire transportation between that seizure and said laying down; said bar is received on said inclined plane, this plane comprising indents allowing the passage of said claws through the plane, said rising and descendant movements not being followed by shock.

5. Feeder device according to claim 4, wherein the long advance module is in a high position when the angle α varies from $α_1$ to $α_2$, and is in a low position when the angle α is 0° or 360°, this low position being progressively reached when α goes from 0° to $α_1$ or from $α_2$ to 360°.

6. Feeder device according to claim 1, wherein the successive positions of the loading device during the loading and unloading cycles can be defined by an angle α, one leg of which is formed by the vertical axis of the driving shaft and the other leg by the straight line connecting the centers of said driving shaft and of the eccentric axle, where the eccentric axle can be identical with the symmetry axis of said cam.

7. Feeder device according to claim 6, wherein during a loading and unloading cycle, the angle α passes from an angle $α_1$ to an angle $α_2$ and vice versa.

8. Feeder device according to claim 7, wherein $α_1, α_2$ is about equal to 60° and 315°, respectively.

9. Feeder device according to claim 1, wherein a bench from which the bar is transferred remains inmobile during the loading and unloading operations.

10. A magazine bar feed, equipped with an automatic bar feeder device according to claim 1.

11. Feeder device according to claim 1, wherein the long advance module coacts with the loading device in such a manner that the rising and descendant movements of stirrups of the long advance module and the movements of the loading device are combined with each other, the long advance module coating with the loading device through a device comprising a set of two levers capable of being articulated around a shaft, one of the ends of the first lever being pivotably mounted on said seesaw, the other end being able to coact with a first stop disposed on the second lever, this second lever being connected to said long advance module through a distance rod and submitted to the action of an elastic element, this action being limited by a second stop.

12. An automatic bar feeder device, which is to be used in a magazine bar feed, comprising:

a device for loading a bar to be machined from a hopper towards and on a bench, and a device for advancing said bar into a lathe, this advancing device containing a short advance module equipped with a flag, and a long advance module equipped with a thrustor, wherein the flag and the thrustor are driven by one and the same element, the short advance module and the long advance module coacting through a coupling element.

13. Feeder device according to claim 12, wherein the coupling element comprises a latching and unlatching device.

14. Feeder device according to claim 13, wherein the latching and unlatching device comprises:

an anchoring element fastened to said module, a latching block made integral with the thrustor rod through a thrustor support and capable of coacting with another thrustor support fastened to a stirrup of the module, said stirrup being able to take a high or a low position in function of the position of said loading device, and a pair of sliders fastened on an element of the magazine bar feed and having two oblique planes parallel to each other whose distance corresponds to the length of the latch.

15. Feeder device according to claim 14, wherein the latching block comprises:

a cylindrical latch having two outer portions of a diameter D1, and a central portion of a diameter D2, and being slidable within a boring having a diameter that corresponds to D1 and being arranged within said block, the cylindrical latch being oriented orthogonally with respact to the axis of said thrustor, and a lodging.

16. Feeder device according to claim 15, wherein the anchoring element is formed by a paw having a boring that is open to a slot, the boring diameter corresponding to the diameter of said outer portions of the latch, and the width of said slot corresponds to the diameter of said central portion of the latch.

17. Feeder device according to claim 15, wherein when said stirrup is turned down and the flag is in its rear position, the latching block encloses the flag, the element of the flag being able to penetrate into the lodging, said slot leaving free passage to the said central portion of the latch which is positioned in the rear region of the sliders.

18. Feeder device according to claim 15, wherein displacement of the flag towards the lathe, provokes the engagement of the outer portion of the latch into the boring of the anchoring element of said flag by the action of said sliders, a plug of the latching block being simultaneously disengaged from a lodging disposed within the thrustor support that is integral with the stirrup.

19. Feeder device according to claim 15, wherein the rearward displacement of the flag latched to the latching block and the thrustor, simultaneously provokes the displacement of the central portion of the latch towards the slot of the anchoring element by the action of the sliders, a plug of the latching block being simustaneously engaged into a lodging disposed within the thrustor support that is integral with the stirrup.

20. A magazine bar feed, equipped with an automatic bar feeder according to claim 12.

* * * * *